US011477224B2

(12) United States Patent
Ahn et al.

(10) Patent No.: US 11,477,224 B2
(45) **Date of Patent: *Oct. 18, 2022**

(54) RULE-BASED NETWORK-THREAT DETECTION FOR ENCRYPTED COMMUNICATIONS

(71) Applicant: Centripetal Networks, Inc., Portsmouth, NH (US)

(72) Inventors: David K. Ahn, Winston-Salem, NC (US); Sean Moore, Hollis, NH (US); Douglas M. Disabello, Leesburg, VA (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,910

(22) Filed: Sep. 23, 2021

(65) Prior Publication Data

US 2022/0014537 A1 Jan. 13, 2022

Related U.S. Application Data

(63) Continuation of application No. 15/877,608, filed on Jan. 23, 2018, which is a continuation of application (Continued)

(51) Int. Cl.

*G06F 21/00* (2013.01)
*H04L 9/40* (2022.01)

(Continued)

(52) U.S. Cl.

CPC ...... *H04L 63/1425* (2013.01); *H04L 61/4511* (2022.05); *H04L 63/0227* (2013.01);

(Continued)

(58) Field of Classification Search

CPC ............ H04L 63/1425; H04L 61/1511; H04L 63/0227; H04L 63/0263; H04L 63/0281;

(Continued)

(56) References Cited

U.S. PATENT DOCUMENTS 5,878,231 A * 3/1999 Baehr ................ H04L 63/0236 709/245
6,098,172 A 8/2000 Coss et al.

(Continued)

FOREIGN PATENT DOCUMENTS

AU 2005328336 B2 9/2011
AU 2006230171 B2 6/2012

(Continued)

OTHER PUBLICATIONS

Nov. 3, 2021—(EP) Notice of Opposition—Patent No. 3395043 [App. No. 16840343.4].

(Continued)

*Primary Examiner* — Trong H Nguyen
*Assistant Examiner* — Michael M Lee
(74) *Attorney, Agent, or Firm* — Banner & Witcoff, Ltd.

(57) ABSTRACT

A packet-filtering system configured to filter packets in accordance with packet-filtering rules may receive data indicating network-threat indicators and may configure the packet-filtering rules to cause the packet-filtering system to identify packets comprising unencrypted data, and packets comprising encrypted data. A portion of the unencrypted data may correspond to one or more of the network-threat indicators, and the packet-filtering rules may be configured to cause the packet-filtering system to determine, based on the portion of the unencrypted data, that the packets comprising encrypted data correspond to the one or more network-threat indicators.

30 Claims, 13 Drawing Sheets

Related U.S. Application Data

No. 14/757,638, filed on Dec. 23, 2015, now Pat. No. 9,917,856.

(51) Int. Cl.
*H04L 61/4511* (2022.01)
*H04L 69/22* (2022.01)

(52) U.S. Cl.
CPC ...... *H04L 63/0263* (2013.01); *H04L 63/0281* (2013.01); *H04L 63/1416* (2013.01); *H04L 63/20* (2013.01); *H04L 69/22* (2013.01); *H04L 63/1441* (2013.01)

(58) Field of Classification Search
CPC ..... H04L 63/1416; H04L 63/20; H04L 69/22; H04L 63/1441
See application file for complete search history.

(56) References Cited

U.S. PATENT DOCUMENTS 6,147,976 A 11/2000 Shand et al.
6,226,372 B1 5/2001 Beebe et al.
6,279,113 B1 8/2001 Vaidya
6,317,837 B1 11/2001 Kenworthy
6,389,532 B1 5/2002 Gupta et al.
6,484,261 B1 11/2002 Wiegel
6,611,875 B1 8/2003 Chopra et al.
6,662,235 B1 12/2003 Callis et al.
6,678,827 B1 1/2004 Rothermel et al.
6,826,694 B1 11/2004 Dutta et al.
6,907,042 B1 6/2005 Oguchi
6,971,028 B1 11/2005 Lyle et al.
7,032,031 B2 4/2006 Jungck et al.
7,089,581 B1 8/2006 Nagai et al.
7,095,716 B1 8/2006 Ke et al.
7,107,613 B1 9/2006 Chen et al.
7,143,438 B1 11/2006 Coss et al.
7,152,240 B1 12/2006 Green et al.
7,185,368 B2 2/2007 Copeland, III
7,215,637 B1 5/2007 Ferguson et al.
7,225,269 B2 5/2007 Watanabe
7,227,842 B1 6/2007 Ji et al.
7,237,267 B2 6/2007 Rayes et al.
7,263,099 B1 8/2007 Woo et al.
7,296,288 B1 11/2007 Hill et al.
7,299,353 B2 11/2007 Le Pennec et al.
7,331,061 B1 2/2008 Ramsey et al.
7,437,362 B1 * 10/2008 Ben-Natan .......... G06F 21/6227 707/999.009
7,478,429 B2 1/2009 Lyon
7,499,412 B2 3/2009 Matityahu et al.
7,539,186 B2 5/2009 Aerrabotu et al.
7,584,352 B2 9/2009 Boivie et al.
7,610,621 B2 10/2009 Turley et al.
7,684,400 B2 3/2010 Govindarajan et al.
7,710,885 B2 5/2010 Ilnicki et al.
7,721,084 B2 5/2010 Salminen et al.
7,778,194 B1 8/2010 Yung
7,792,775 B2 9/2010 Matsuda
7,793,342 B1 9/2010 Ebrahimi et al.
7,814,158 B2 10/2010 Malik
7,814,546 B1 10/2010 Strayer et al.
7,818,794 B2 10/2010 Wittman
7,849,502 B1 12/2010 Bloch et al.
7,913,303 B1 3/2011 Rouland et al.
7,954,143 B2 5/2011 Aaron
8,004,994 B1 8/2011 Darisi et al.
8,009,566 B2 8/2011 Zuk et al.
8,037,517 B2 10/2011 Fulp et al.
8,042,167 B2 10/2011 Fulp et al.
8,117,655 B2 2/2012 Spielman
8,156,206 B2 4/2012 Kiley et al.
8,161,547 B1 4/2012 Jennings et al.
8,176,561 B1 5/2012 Hurst et al.
8,219,675 B2 7/2012 Ivershen
8,271,645 B2 9/2012 Rajan et al.
8,306,994 B2 11/2012 Kenworthy
8,307,029 B2 11/2012 Davis et al.
8,331,234 B1 12/2012 Newton et al.
8,370,936 B2 2/2013 Zuk et al.
8,422,391 B2 4/2013 Zhu
8,495,725 B2 7/2013 Ahn
8,504,822 B2 8/2013 Wang et al.
8,510,821 B1 8/2013 Brandwine et al.
8,578,486 B2 11/2013 Lifliand et al.
8,726,379 B1 5/2014 Stiansen et al.
8,789,135 B1 7/2014 Pani
8,806,638 B1 8/2014 Mani
8,813,228 B2 8/2014 Magee et al.
8,832,832 B1 9/2014 Visbal
8,856,926 B2 10/2014 Narayanaswamy et al.
8,892,665 B1 11/2014 Rostami-Hesarsorkh et al.
8,935,785 B2 1/2015 Pandrangi
9,077,692 B1 7/2015 Burns et al.
9,094,445 B2 7/2015 Moore et al.
9,124,552 B2 9/2015 Moore
9,137,205 B2 9/2015 Rogers et al.
9,154,446 B2 10/2015 Gemelli et al.
9,160,713 B2 10/2015 Moore
9,172,627 B2 10/2015 Kjendal et al.
9,258,218 B2 2/2016 Hampel et al.
9,419,942 B1 8/2016 Buruganahalli et al.
9,531,672 B1 12/2016 Li et al.
9,634,911 B2 4/2017 Meloche
9,680,795 B2 6/2017 Buruganahalli et al.
9,686,193 B2 6/2017 Moore
9,875,355 B1 1/2018 Williams
9,917,856 B2 3/2018 Ahn et al.
2001/0039579 A1 11/2001 Trcka et al.
2001/0039624 A1 11/2001 Kellum
2002/0016858 A1 2/2002 Sawada et al.
2002/0038339 A1 3/2002 Xu
2002/0049899 A1 4/2002 Kenworthy
2002/0083345 A1 6/2002 Halliday et al.
2002/0112188 A1 8/2002 Syvanne
2002/0152209 A1 10/2002 Merugu et al.
2002/0164962 A1 11/2002 Mankins et al.
2002/0165949 A1 11/2002 Na et al.
2002/0186683 A1 12/2002 Buck et al.
2002/0198981 A1 12/2002 Corl et al.
2003/0005122 A1 1/2003 Freimuth et al.
2003/0014665 A1 1/2003 Anderson et al.
2003/0018591 A1 1/2003 Komisky
2003/0035370 A1 2/2003 Brustoloni
2003/0051026 A1 3/2003 Carter et al.
2003/0088787 A1 5/2003 Egevang
2003/0097590 A1 5/2003 Syvanne
2003/0105976 A1 6/2003 Copeland
2003/0120622 A1 6/2003 Nurmela et al.
2003/0123456 A1 7/2003 Denz et al.
2003/0142681 A1 7/2003 Chen et al.
2003/0145225 A1 7/2003 Bruton et al.
2003/0154297 A1 8/2003 Suzuki et al.
2003/0154399 A1 8/2003 Zuk et al.
2003/0188192 A1 10/2003 Tang et al.
2003/0212900 A1 11/2003 Liu et al.
2003/0220940 A1 11/2003 Futoransky et al.
2004/0010712 A1 1/2004 Hui et al.
2004/0015719 A1 1/2004 Lee et al.
2004/0073655 A1 4/2004 Kan et al.
2004/0088542 A1 5/2004 Daude et al.
2004/0093513 A1 5/2004 Cantrell et al.
2004/0098511 A1 5/2004 Lin et al.
2004/0114518 A1 6/2004 MacFaden et al.
2004/0123220 A1 6/2004 Johnson et al.
2004/0131056 A1 7/2004 Dark
2004/0148520 A1 7/2004 Talpade et al.
2004/0151155 A1 8/2004 Jouppi
2004/0172529 A1 9/2004 Culbert
2004/0172557 A1 9/2004 Nakae et al.
2004/0177139 A1 9/2004 Schuba et al.
2004/0181690 A1 9/2004 Rothermel et al.
2004/0193943 A1 9/2004 Angelino et al.

(56) References Cited

U.S. PATENT DOCUMENTS

2004/0199629 A1 10/2004 Bomer et al.
2004/0205360 A1 10/2004 Norton et al.
2004/0250124 A1 12/2004 Chesla et al.
2005/0010765 A1 1/2005 Swander et al.
2005/0024189 A1 2/2005 Weber
2005/0071650 A1 3/2005 Jo et al.
2005/0076227 A1 4/2005 Kang et al.
2005/0102525 A1 5/2005 Akimoto
2005/0108557 A1 5/2005 Kayo et al.
2005/0114704 A1 5/2005 Swander
2005/0117576 A1 6/2005 McDysan et al.
2005/0125697 A1 6/2005 Tahara
2005/0138204 A1 6/2005 Iyer et al.
2005/0138353 A1 6/2005 Spies et al.
2005/0138426 A1 6/2005 Styslinger
2005/0141537 A1 6/2005 Kumar et al.
2005/0183140 A1 8/2005 Goddard
2005/0229246 A1 10/2005 Rajagopal et al.
2005/0249214 A1 11/2005 Peng
2005/0251570 A1 11/2005 Heasman et al.
2005/0283823 A1 12/2005 Okajo et al.
2005/0286522 A1 12/2005 Paddon et al.
2006/0031928 A1 2/2006 Conley et al.
2006/0048142 A1 3/2006 Roese et al.
2006/0053491 A1 3/2006 Khuti et al.
2006/0070122 A1 3/2006 Bellovin
2006/0080733 A1 4/2006 Khosmood et al.
2006/0085849 A1 4/2006 Culbert
2006/0104202 A1 5/2006 Reiner
2006/0114899 A1 6/2006 Toumura et al.
2006/0133377 A1 6/2006 Jain
2006/0136987 A1 6/2006 Okuda
2006/0137009 A1 6/2006 Chesla
2006/0146879 A1 7/2006 Anthias et al.
2006/0159028 A1 7/2006 Curran-Gray et al.
2006/0195896 A1 8/2006 Fulp et al.
2006/0212572 A1 9/2006 Afek et al.
2006/0248580 A1 11/2006 Fulp et al.
2006/0262798 A1 11/2006 Joshi et al.
2007/0056038 A1 3/2007 Lok
2007/0083924 A1 4/2007 Lu
2007/0118894 A1 5/2007 Bhatia
2007/0147380 A1 6/2007 Ormazabal et al.
2007/0180510 A1 8/2007 Long et al.
2007/0211644 A1 9/2007 Ottamalika et al.
2007/0240208 A1 10/2007 Yu et al.
2007/0271605 A1 11/2007 Le Pennec et al.
2007/0291789 A1 12/2007 Kutt et al.
2008/0005795 A1 1/2008 Acharya et al.
2008/0028467 A1 1/2008 Kommareddy et al.
2008/0043739 A1 2/2008 Suh et al.
2008/0072307 A1 3/2008 Maes
2008/0077705 A1 3/2008 Li et al.
2008/0080493 A1 4/2008 Weintraub et al.
2008/0086435 A1 4/2008 Chesla
2008/0101234 A1 5/2008 Nakil et al.
2008/0163333 A1 7/2008 Kasralikar
2008/0201772 A1 8/2008 Mondaeev et al.
2008/0229415 A1 9/2008 Kapoor et al.
2008/0235755 A1 9/2008 Blaisdell et al.
2008/0279196 A1 11/2008 Friskney et al.
2008/0301765 A1 12/2008 Nicol et al.
2008/0313738 A1 12/2008 Enderby
2008/0320116 A1 12/2008 Briggs
2009/0028160 A1 1/2009 Eswaran et al.
2009/0138938 A1 5/2009 Harrison et al.
2009/0144819 A1 6/2009 Babbar et al.
2009/0150972 A1 6/2009 Moon et al.
2009/0172800 A1 7/2009 Wool
2009/0222877 A1 9/2009 Diehl et al.
2009/0240698 A1 9/2009 Shukla et al.
2009/0262723 A1 10/2009 Pelletier et al.
2009/0262741 A1 10/2009 Jungck et al.
2009/0300759 A1 12/2009 Wang et al.
2009/0320106 A1 12/2009 Jones et al.
2009/0328219 A1 12/2009 Narayanaswamy
2010/0011433 A1 1/2010 Harrison et al.
2010/0011434 A1 1/2010 Kay
2010/0037311 A1 2/2010 He et al.
2010/0082811 A1 4/2010 Van Der Merwe et al.
2010/0095367 A1 4/2010 Narayanaswamy
2010/0107240 A1 4/2010 Thaler et al.
2010/0115621 A1 5/2010 Staniford et al.
2010/0132027 A1 5/2010 Ou
2010/0195503 A1 8/2010 Raleigh
2010/0199346 A1 8/2010 Ling et al.
2010/0202299 A1 8/2010 Strayer et al.
2010/0211678 A1 8/2010 McDysan et al.
2010/0232445 A1 9/2010 Bellovin
2010/0242098 A1 9/2010 Kenworthy
2010/0250731 A1 9/2010 Xiao
2010/0268799 A1 10/2010 Maestas
2010/0296441 A1 11/2010 Barkan
2010/0303240 A1 12/2010 Beachem et al.
2011/0055916 A1 3/2011 Ahn
2011/0055923 A1 3/2011 Thomas
2011/0088092 A1 4/2011 Nguyen et al.
2011/0141900 A1 6/2011 Jayawardena et al.
2011/0154470 A1 6/2011 Grimes et al.
2011/0185055 A1 7/2011 Nappier et al.
2011/0214157 A1 9/2011 Korsunsky et al.
2011/0270956 A1 11/2011 McDysan et al.
2011/0277034 A1 11/2011 Hanson
2011/0296186 A1 12/2011 Wong et al.
2012/0005743 A1 1/2012 Kitazawa et al.
2012/0023576 A1 1/2012 Sorensen et al.
2012/0084866 A1 4/2012 Stolfo
2012/0106354 A1 5/2012 Pleshek et al.
2012/0110656 A1 5/2012 Santos et al.
2012/0113987 A1 5/2012 Riddoch et al.
2012/0124645 A1* 5/2012 Ratica ................ H04L 61/2503
709/245
2012/0240135 A1 9/2012 Risbood et al.
2012/0240185 A1 9/2012 Kapoor et al.
2012/0264443 A1 10/2012 Ng et al.
2012/0290829 A1 11/2012 Mtman
2012/0314617 A1 12/2012 Erichsen et al.
2012/0331543 A1 12/2012 Bostrom et al.
2013/0007257 A1 1/2013 Ramaraj et al.
2013/0047020 A1 2/2013 Hershko et al.
2013/0059527 A1 3/2013 Hasesaka et al.
2013/0061294 A1 3/2013 Kenworthy
2013/0104236 A1 4/2013 Ray et al.
2013/0117852 A1 5/2013 Stute
2013/0139236 A1 5/2013 Rubinstein et al.
2013/0254766 A1 9/2013 Zuo et al.
2013/0291100 A1 10/2013 Ganapathy et al.
2013/0305311 A1 11/2013 Puttaswamy Naga et al.
2013/0312054 A1 11/2013 Wang et al.
2014/0075510 A1 3/2014 Sonoda et al.
2014/0082204 A1 3/2014 Shankar et al.
2014/0082730 A1 3/2014 Vashist et al.
2014/0089661 A1 3/2014 Mahadik et al.
2014/0115654 A1 4/2014 Rogers et al.
2014/0150051 A1 5/2014 Bharali et al.
2014/0165189 A1 6/2014 Foley et al.
2014/0201123 A1 7/2014 Ahn et al.
2014/0215561 A1 7/2014 Roberson et al.
2014/0215574 A1 7/2014 Erb et al.
2014/0245423 A1 8/2014 Lee
2014/0259170 A1 9/2014 Amsler
2014/0281030 A1 9/2014 Cui et al.
2014/0283004 A1 9/2014 Moore
2014/0283030 A1 9/2014 Moore et al.
2014/0310396 A1 10/2014 Christodorescu et al.
2014/0317397 A1 10/2014 Martini
2014/0317737 A1 10/2014 Shin et al.
2014/0337613 A1 11/2014 Martini
2014/0365372 A1 12/2014 Ross et al.
2014/0366132 A1 12/2014 Stiansen et al.
2014/0373156 A1 12/2014 Dubrovsky et al.
2015/0033336 A1 1/2015 Wang et al.
2015/0052345 A1 2/2015 Martini

(56) References Cited

U.S. PATENT DOCUMENTS

2015/0052601 A1* 2/2015 White ................ H04L 63/1416 726/13
2015/0106930 A1 4/2015 Honda et al.
2015/0121449 A1 4/2015 Cp et al.
2015/0128274 A1 5/2015 Giokas
2015/0135325 A1 5/2015 Stevens et al.
2015/0207809 A1 7/2015 Macaulay
2015/0207813 A1 7/2015 Reybok et al.
2015/0237012 A1 8/2015 Moore
2015/0244734 A1 8/2015 Olson et al.
2015/0256431 A1 9/2015 Buchanan et al.
2015/0304354 A1 10/2015 Rogers et al.
2015/0334125 A1 11/2015 Bartos et al.
2015/0341389 A1 11/2015 Kurakami
2015/0347246 A1 12/2015 Matsui et al.
2015/0350229 A1 12/2015 Mitchell
2015/0372977 A1 12/2015 Yin
2015/0373043 A1 12/2015 Wang et al.
2016/0020968 A1 1/2016 Aumann et al.
2016/0028751 A1 1/2016 Cruz Mota et al.
2016/0065611 A1 3/2016 Fakeri-Tabrizi et al.
2016/0112443 A1 4/2016 Grossman et al.
2016/0119365 A1 4/2016 Barel
2016/0127417 A1 5/2016 Janssen
2016/0180022 A1 6/2016 Paixao
2016/0191558 A1 6/2016 Davison
2016/0205069 A1 7/2016 Blocher et al.
2016/0219065 A1 7/2016 Dasgupta et al.
2016/0285706 A1 9/2016 Rao
2016/0294870 A1 10/2016 Banerjee et al.
2016/0366099 A1 12/2016 Jordan
2017/0171232 A1* 6/2017 Graham-Cumming ...................... H04L 61/5007
2017/0223046 A1 8/2017 Singh
2017/0272469 A1 9/2017 Kraemer et al.

FOREIGN PATENT DOCUMENTS

| | | | |
|---|---|---|---|
| CA | 2600236 | A1 | 10/2006 |
| EP | 1006701 | A2 | 6/2000 |
| EP | 1313290 | A1 | 5/2003 |
| EP | 1484884 | A2 | 12/2004 |
| EP | 1677484 | A2 | 7/2006 |
| EP | 2385676 | A1 | 11/2011 |
| EP | 2498442 | A1 | 9/2012 |
| EP | 1864226 | B1 | 5/2013 |
| KR | 20010079361 | A | 8/2001 |
| KR | 10-2009-0076556 | A | 7/2009 |
| WO | 2005046145 | A1 | 5/2005 |
| WO | 2006093557 | A2 | 9/2006 |
| WO | 2006105093 | A2 | 10/2006 |
| WO | 2007109541 | A2 | 9/2007 |
| WO | 2011038420 | A2 | 3/2011 |
| WO | 2012146265 | A1 | 11/2012 |
| WO | 2017/112535 | A1 | 6/2017 |

OTHER PUBLICATIONS

Scarfone et al., "Guidelines on Firewalls and Firewall Policy—Recommendations of the National Institute of Standards and Technology," NIST Special Publication 800-41, Revision 1 (Sep. 2009).
Oct. 29, 2021—(AU) Notice of Allowance—App No. 2020202724.
"Sourcefire SSL Appliance Administration & Deployment Guide for SSL 1500, SSL200, and SSL8200; Software Version 3.6," published in 2014, submitted as—Exhibit D6-.
Nov. 23, 2021—(EP) Notice of Intervention, Opposition Against EP3395043, 29 pages.
Dec. 20, 2017—U.S. Notice of Allowance—U.S. Appl. No. 14/757,638.
Mar. 10, 2021—(EP) Communication and European Search Report—App. 21153219.7.
Mar. 31, 2021—U.S. Final Office Action—U.S. Appl. No. 15/877,608.
May 11, 2021—AU—First Examination Report—App 2020202724.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Reporton Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.

(56) References Cited

OTHER PUBLICATIONS

Sep. 16, 2015 (WO) International Search Report and Written Opinion—App. No. PCT/US2015/024691.
Sep. 4, 2015 U.S. Notice of Allowance—U.S. Appl. No. 14/702,755.
Apr. 15, 2016—U.S. Notice of Allowance—U.S. Appl. No. 14/855,374.
R.L. Graham et al., "Optimization and Approximation in Deterministic Sequencing and Scheduling: A Survey", Annals of Discrete Mathematics, 5:287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al., "The Secure Shell (SSH) Transport Layer Protocol," SSH Communication Security Corp, Newtork Working Group RFC 4253, Jan. 2006, 32 pages.
Aug. 10, 2018 (US) Declaration of Kevin Jeffay, PhD in Support of Fourth Petition for Inter Partes Review of U.S. Pat. No. 9,137,205—IPR2018-01506.
Aug. 10, 2018 (US) Fourth Petition for Inter Partes Review of U.S. Pat. No. 9,137,205—IPR2018-01506.
Aug. 3, 2018 (US) Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,560,077—IPR2018-01513.
Apr. 2, 2019 (US) Decision—Institution of Inter Partes Review of U.S. Pat. No. 9,560,077—IPR 2018-01513.
Aug. 10, 2018 (US) Petition for Inter Partes Review of Claims 1-20 of U.S. Pat. No. 9,560,077—IPR2018-01513.
Jun. 3, 2019 U.S. Final Office Action—U.S. Appl. No. 15/614,956.
May 23, 2019 U.S. Non-Final Office Action—U.S. Appl. No. 14/745,207.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 U.S. Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9
Sep. 1, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 U.S. Notice of Allowance and Fees Due—U.S. Appl. No. 16/518,190.
Aug. 19, 2019 (EP) Communication pursuant to Article 94(3) EPC—Examination Report—App. 14719415.3.
Oct. 11, 2019—U.S. Non-Final Office Action—U.S. Appl. No. 16/554,293.
Oct. 10, 2019—U.S. Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.
Exhibit 1024—"File Transfer Protocol," IETF RFC 765, J. Postel, ed., Jun. 1980.
May 20, 2019 (US) Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
Nov. 4, 2020—U.S. Non-Final Office Action—U.S. Appl. No. 15/877,608.
Apr. 13, 2020—U.S. Final Office Action—U.S. Appl. No. 15/877,608.
Dec. 2, 2019—U.S. Non-Final Office Action—U.S. Appl. No. 15/877,608.
Jun. 23, 2021—(EP) Notice of Opposition—Patent No. 2974212 [App. No. 14719415.3].
Deering & Hinden, "Internet Protocol, Version 6 (IPv6)," The Internet Society, RFC 2460 (Dec. 1998).
Dierks & Allen, "The TLS Protocol, Version 1.0," The Internet Society, RFC 2246 (Jan. 1999).
Dierks & Rescorla, "The Transport Layer Security (TLS) Protocol Version 1.2," The IETF Trust, RFC 5246 (Aug. 2008).
Fielding et al., "Hypertext Transfer Protocol—HTTP/1.1," The Internet Society, RFC 2616 (Jun. 1999).
Eric Cole et al., Network Security Bible, pp. 237-254 (2005).
Richard A. Deal, "Cisco Router Firewall Security," pp. 5-51, 259-260, 301-317, 351-361,444-450, 597-603, 631 (2004).
Declaration of Sarah Ehrig on "Sourcefire 3D System User Guide Version 4.10" (Jun. 14, 2021).
Sourcefire 3D System User Guide Version 5.1.1 (2012).
Declaration of Jacob H. Baugher III filed in IPR2018-01760 *Cisco Systems, Inc.* v. *Centripetal Networks, Inc.* (Dec. 4, 2019).
Declaration of Sarah Ehrig on "Sourcefire 3D System User Guide Version 5.1.1" (Jun. 21, 2021).
Re-Exam of U.S. Pat. No. 9,686,193.
Jul. 21, 2021—(US) Petitioner's Power of Attorney—IPR2022-00182, U.S. Pat. No. 9,917,856, 3 pages.
Nov. 18, 2021—(US) Petition for Inter Partes Review—IPR2022-00182, U.S. Pat. No. 9,917,856, 60 pages.
Exhibit 1002—File History of U.S. Pat. No. 9,917,856, issued Mar. 13, 2018.
Exhibit 1003—Nov. 18, 2021—Declaration of Dr. Jon Weissman in Support of Petition of Inter Partes Review of U.S. Pat. No. 9,917,856, 142 pages.

(56) References Cited

OTHER PUBLICATIONS

Exhibit 1007—Leiner, "A Brief History of the Internet," 1997, 19 pages.
Exhibit 1009—Nov. 29, 1988—Spafford, "The Internet Worm Program: An Analysis," 41 pages.
Exhibit 1010—Jun. 1989, Rochlis, et al., "With Microscope and Tweezers: The Worm from MIT's Perspective," The Internet Worm, Communications of the ACM, vol. 32, No. 6, pp. 689-698.
Exhibit 1011—Jun. 1989—Eisenberg, et al., The Cornell Comission: On Morris and the Worm, The Internet Worm, Communications of the ACM, vol. 32, No. 6, pp. 706-709.
Exhibit 1012—Mar. 1989—Mogul, "Simple and Flexible Datagram Access Controls for Unix-Based Gateways," 34 pages.
Exhibit 1013—Jan. 2, 2014, Welch-Abernathy, "Blast from the CHKP Past: Can't Talk to Translated IP from Internal Net," PhoneBoy's Security Theater, <<https://web.archive.org/web/20140102143305/http://phoneboy.net?>>, 12 pages.
Exhibit 1014—SonicWALL® Global Management System, Policy and Management, Centralized Network Monitoring and Management Solution, date of publication unknown but, prior to Nov. 19, 2021, 2 pages.
Exhibit 1015—Jan. 2010, SonicWALL® ViewPoint 6.0 Administrator Guide, 392 pages.
Exhibit 1016—Nov. 1989, Herberlein, et al., "A Network Security Monitor," Division of Computer Science, 37 pages.
Exhibit 1017—1997—NetRanger™, Network Security, Management System, User's Guide, 335 pages.
Exhibit 1018—Nov. 7-12, 1999, Roesch, "Snort-Lightweight Intrusion Detection for Networks," Proceedings of LISA '99: 13th Systems Administralion Conference, pp. 229-238.
Exhibit 1020—Feb. 9, 2004, "W32.HLLW.Doomjuice," <<https://www.symantec.com/security-center/writeup/2004-020909-2916-99>>, 2 pages.
Exhibit 1021—Sep. 13, 2003, "(Vendor Issues Fix) Re: Helix Universal Server and RealServer URL Parsing Flaw in View Source Plug-in Lets Remote Users Execute Arbitrary Code With Root Privileges," <<https://securitytracker.com/d/1007692>>, 2 pages.
Exhibit 1022—Sep. 1981—Transmission Control Protocol, DARPA Internet Program Protocol Specification, RFC 793, <<https://web.archive.org/web/20070202201546/https://tools.ietf.org/html/rfc793>>, 64 pages.
Exhibit 1023—Sep. 1981—Internet Protocol, DARPA Internet Program Protocol Specification, RFC 791, <<https:l/web.archive.org/web/20070204151303/https://tools.ietf.org/html/rfc791>>, 36 pages.
Exhibit 1024, Jun. 1980—Postel, file Transfer Protocol, RFC 756, <<https://web.archive.org/web/20070206005843/https://tools.ietf.org/html/rfc765>>, 52 pages.
Exhibit 1025, Jun. 5, 1997, Lee, "The Original," <<https://web.archive.org/web/19970605071155/https://www.w3.org.Protocols/HTTP/AsImplemented.html>>, 2 pages.
Exhibit 1026—May 18, 2020, Paper 41, Judgment, Final Written Decision Determining Some Challenged Claims Unpatentable Denying Petitioner's Motion to Exclude Denying Patent Owner's Motion to Exclude 35 U.S.C. § 318(a), IPR2018-01760, U.S. Pat. No. 9,413,722 B1, 57 pages.
Exhibit 1027—Oct. 5, 2020, Opinion and Order, Case 2:18-cv-00094-HCM-LRL, Document 621, 178 pages.
Exhibit 1028—Aug. 27, 2021, Non-Confidential Brief for Defendent-Appellant Cisco Systems, Inc., Case: 21-1888, Document 18, 82 pages.
Exhibit 1029—Aug. 10, 2020—Transcript of Videoconference Bench Trial Proceedings, Case 2:18-cv-00094-HCM-LRL, Document 548, 61 pages.
Exhibit 1030—Sep. 17, 2018—Opinion and Order, Case 2:17-cv-00383-HCM-LRL, Document 484, 36 pages.
Exhibit 1031—Mar. 18, 2011—S. Turner, et al., "Prohibiting Secure Sockets Layer (SSL) Version 2.0," Internet Engineering Task Force (IETF) RFC 6176, 5 pages.
Exhibit 1032—Apr. 30, 2018, SSL/TLS and PKI History, <<https://www.feistyduck.com/ssl-tls-and-pki-history/>>, 34 pages.
Exhibit 1036—Jan. 2002—Wack, et al., Guidelines on Firewalls and Firewall Policy, Recommendaitons of the National Institute of Standards and Technology, NIST Special Publication 800-41, 75 pages.
Exhibit 1045—Kim, et al., "Design of Firewall in Router using Network Processor," date of publication unknown but, prior to Nov. 19, 2021, 3 pages.
Exhibit 1046—Nov. 18, 2021—Declaration of Jonathan Bradford in Support of Petition for Inter Partes Review of U.S. Pat. No. 9,917,856, Case IPR2022-00182, 16 pages.
Sep. 4, 2018 (WO) International Search Report and Written Opinion—App. PCT/US2018/041355.
Sep. 27, 2018 U.S. Non-Final Office Action—U.S. Appl. No. 15/614,956.
Apr. 8, 2019 U.S. Final Office Action—U.S. Appl. No. 15/413,947.
Feb. 21, 2019 U.S. Final Office Action—U.S. Appl. No. 15/382,806.
Feb. 6, 2019 U.S. Final Office Action—U.S. Appl. No. 15/413,750.
Feb. 6, 2019 U.S. Notice of Allowance and Fees Due—U.S. Appl. No. 16/039,896.
Jan. 24, 2019 U.S. Notice of Allowance—U.S. Appl. No. 15/610,995.
Mar. 11, 2019 U.S. Final Office Action—U.S. Appl. No. 16/030,354.
Mar. 18, 2019 (AU) First Examination Report—App. 2016379156.
Mar. 8, 2019 U.S. Notice of Allowance and Fees Due—U.S. Appl. No. 16/030,374.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al, "An Architecture for Differentiated Services," Network Working Group RFC 2475, Dec. 1998, 36 pages.
C. Benecke, "A Parallel Packet Screen for High Speed Networks", Proceedings of the 15th Annual Computer Security Applications Conference, 1999.
Chen, et al, "Research on the Anomaly Discovering Algorithm of the Packet Filtering Rule Sets," Sep. 2010, First International Confererence on Pervasive Computing, Signal Processing and Applications, pp. 362-366.
D. Corner, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.

(56) References Cited

OTHER PUBLICATIONS

E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35,1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDsfor Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al, "Definition of the Differentiated Services Field (DS Field) in the IPv4 and IPv6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing a Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
Apr. 26, 2016—U.S. Office Action—U.S. Appl. No. 14/745,207.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 29, 2017 (CA) Examination Report—App. 2,772,630.
Apr. 17, 2018 U.S. Non-Final Office Action—U.S. Appl. No. 15/610,995.
Aug. 29, 2018 (CA) Office Action—App. 2,888,935.
Aug. 9, 2018 U.S. Non-Final Office Action—U.S. Appl. No. 15/413,947.
Dec. 18, 2018 U.S. Final Office Action—U.S. Appl. No. 15/610,995.
Jul. 13, 2018 U.S. Notice of Allowance—U.S. Appl. No. 15/414,117.
Jul. 27, 20187 U.S. Non-Final Office Action—U.S. Appl. No. 15/382,806.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
Nov. 14, 2018 U.S. Final Office Action—U.S. Appl. No. 14/745,207.
Oct. 12, 2018 U.S. Non-Final Office Action—U.S. Appl. No. 16/039,896.
Oct. 4, 2018 U.S. Non-Final Office Action—U.S. Appl. No. 16/030,374.
Oct. 4, 2018 U.S. Notice of Allowance—U.S. Appl. No. 15/827,477.
Sep. 27, 2018 (WO) International Search Report and Written Opinion—App. PCT/US2018/043367.
Cisco, "User Guide for ASA CX and Cisco Prime Security Manager," version 9.1, published 2013, incluing archived web page <<http://vrt-blog.snort.orgl20 1 0107/new-mle-catagories.html>>, dated Jan. 17, 2011, 370 pages.
Jul. 14, 2020, VRT: New Rule Categories, <<http://web.archive.org/web/20110117030348/http://vrt-blog.snort.org/2010/07/new-rule-categories.html>>, 4 pages.
Mar. 25, 2011, SNORT® Users Manual 2.9.0, The Snort Project, with webpage from The Wayback Machine, <<htts://web.archive.org/web/20110414184811/http://www.snort.org:80/start/docu . . . >>, 204 pages.
Feb. 3, 2022—(DE) English Translation of Request for the Cancellation of Utility Model 20 2016 008 885.9, 49 pages.
Mar. 8, 2022—(DE) Response to Request for Cancellation of the German Utility Model DE 20 2016 008 885.9 U1, 2 pages.
Feb. 28, 2022—Patent Owner's Preliminary Response, Case IPR2022-00182, U.S. Pat. No. 9,917,756, *Palo Alto Networks, Inc.* v. *Centripetal Networks, Inc.*, 67 pages.
Apr. 18, 2022—Case IPR2022-00182—U.S. Pat. No. 9,917,856, Patent Owner's Preliminary Sur-Reply, 10 pages.

(56) References Cited

OTHER PUBLICATIONS

Apr. 11, 2022—Case IPR2022-00182, U.S. Pat. No. 9,917,856, Petitioner's Preliminary Reply to Patent Owner's Preliminary Response Addressing the Issue of Discretionary Denial Under § 314(a), 10 pages.
Exhibit 2008—Internet Archive WayBack Machine—Membership—Cyber Threat Alliance, available from <<https://web.archive.org/web/20211009155735/https://cyberthreatalliance.org/memebership/>>, captured Oct. 9, 2021, 5 pages.
Exhibit 2009—Palo Alto Networks Brief—Palo Alto Networks and Cisco ACI, dated 2019, 2 pages.
Exhibit 2010—Internet Archive WayBack Machine—Scott McKeown, PTAB Denies Petition Overlooking Objective Indicia of Non-Obviousness, Ropes & Gray—Patents Post-Grant (Sep. 18, 2019), available from <<http://web.archive.org/web/20210303015939/https://www.patentspostgrant.com/ptab-denies-petition-overlooking-objecting-indicia-of-non-obviousness/>>, captured Mar. 3, 2021, 2 pages.
Exhibit 2011—Transcript of Telephonic Proceedings on Motion for Sanctions, *Palo Alto Networks, Inc.* v. *Centripetal Networks, Inc.* Nos. IPR2021-01520, IPR2021-01521, IPR2022-00182, dated Feb. 10, 2022, 20 pages.
Jul. 8, 2022, Request for Cancellation of German Nullity Model DE 20 2016 008 885.9 U1, Official File No. 20 2016 008 885.9, Applicant: Cisco Systems GmbH, Owner: Centripetal Networks Inc., with English translation, 61 pages.
May 25, 2022, Decision Granting Institution of Inter Partes Review 35 U.S.C. § 314, IPR2022-00182, U.S. Pat. No. 9,917,856 B2, 92 pages.
Jun. 8, 2022, Patent Owner's Request for Rehearing in IPR2022-00182, U.S. Pat. No. 9,917,856, 18 pages.
Jun. 24, 2022, Response to Opposition, App. No. EP16840343.4, Patent No. EP3395043B1, Opponents: Cisco Systems GmbH and (2) Cisco Systems, Inc., 47 pages.
Exhibit MFG 1, Feature Structure of Claim 1, App. No. EP16840343.4, Patent No. EP3395043B1, 1 page.
Jun. 24, 2022, Petition for Inter Partes Review, Case IPR2022-01151, U.S. Pat. No. 9,917,856, *Cisco Systems, Inc.* v. *Centripetal Networks, Inc.*, 77 pages.
Jun. 24, 2022, Petitioner's Motion for Joinder Under 35 U.S.C. § 315(c), 37 C.F.R. §§ 42.22, and 42.122(b), Case IPR2022-01151, U.S. Pat. No. 9,917,856, *Cisco Systems, Inc.* v *Centripetal Networks, Inc.*, 14 pages.
Jun. 24, 2022, Petition for Inter Partes Review of U.S. Pat. No. 9,917,856, IPR No. Unassigned, *Keysight Technologies, Inc.* v. *Centripetal Networks, Inc.*, 63 pages.
Jun. 24, 2022, Petitioner's Motion for Joinder, Case IPR Unassigned, U.S. Pat. No. 9,917,856, *Keysight Technologies, Inc.* v. *Centripetal Networks, Inc.*, 17 pages.
Exhibit 1013 as cited in Petitions for Inter Partes Review in IPR2022-01151 and IPR2022-01199, U.S. Pat. No. 9,917,856, dated Jun. 24, 2022, "FireWall-1 User Interface from 3.0," PhoneBoy's Security Theater, archived at the Internet Archive Wayback Machine on Jan. 2, 2014, at <<https://web.archive.org/web/20140102143305/http://phoneboy.net/>> ("FireWall-1"), 12 pages.
Exhibit 1100 as cited in Petition for Inter Partes Review in IPR2022-01151, U.S. Pat. No. 9,917,856, dated Jun. 24, 2022, Patent Owner's Trial Exhibit 464 (PTX-464) admitted by Patent Owner in *Centripetal Networks, Inc.* v. *Cisco Systems, Inc.*, Case No. 2:18-cv-00094 (E.D. Va.), EX-1029 (3217:20-3223:6), 3 pages.
Exhibit 1101 as cited in Petition for Inter Partes Review in IPR2022-01151, U.S. Pat. No. 9,917,856, dated Jun. 24, 2022, Patent Owner's Trial Exhibit 1135 (PTX-1135) admitted by Patent Owner in *Centripetal Networks, Inc* v. *Cisco Systems, Inc.*, Case No. 2:18-cv-00094 (E.D. Va.), e g., EX-1029 (3216:8-3217:19, 3233:12-3235:2), EX-1027, pp. 63-64, 137-139, 151-152, 2 pages.
Exhibit 1102 as cited in Petition for Inter Partes Review in IPR2022-01151, U.S. Pat. No. 9,917,856, dated Jun. 24, 2022, *Centripetal Networks, Inc.* v. *Cisco Systems, Inc.*, Case No. 20-1635, Document 20, Centripetal's Opening Brief, filed Jul. 10, 2020, Appeals in Nos. IPR2018-01436 and IPR2018-01437, 42 pages.
Exhibit 1103 as cited in Petition for Inter Partes Review in IPR2022-01151, U.S. Pat. No. 9,917,856, dated Jun. 24, 2022, *Centripetal Networks, Inc.* v. *Cisco Systems, Inc.*, Case No. 2:18-cv-00094 (E.D. Va.), Dkt. No. 521 (May 21, 2020, Trial Transcript), 181 pages.
Exhibit 1104 as cited in Petition for Inter Partes Review in IPR2022-01151, U.S. Pat. No. 9,917,856, dated Jun. 24, 2022, and as Exhibit 1048 in Petition for for Inter Partes Review of U.S. Pat. No. 9,917,856, IPR No. Unassigned, *Keysight Technologies, Inc.* v. *Centripetal Networks, Inc.*, dated Jun. 24, 2022, *Centripetal Networks, Inc.* v. *Cisco Systems, Inc.*, Case No. 21-1888, slip op., Document 68, (Fed. Cir. Jun. 23, 2022) (opinion vacating judgment), available at <<https://cafe.uscourts.gov/opinions-orders/21-1888.OPINION.6-23-2022_1968538.pdf>>, 27 pages.
Exhibit 1046 as cited in Jun. 2, 20224, Petition for Inter Partes Review of U.S. Pat. No. 9,917,856, IPR No. Unassigned, *Keysight Technologies, Inc.* v. *Centripetal Networks, Inc.*, Declaration of John Hendricks in Support of Petition for Inter Partes Review of U.S. Pat. No. 9,917,856, 17 pages.
Jun. 23, 2022, Petitioner's Power of Attorney Pursuant to 37 C.F.R. § 42.10(b) for Petition for Inter Partes Review, Cisco Systems, Inc., 2 pages.
Petition Keysight Technologies, Inc.'s Power of Attorney in an Inter Partes Review, Inter Partes Review No. Unassigned, U.S. Pat. No. 9,917,856, Keysight Technologies, Inc. v. Centripetal Networks, Inc., 3 pages.
Exhibit 1003 as cited in Petition for Inter Partes Review of U.S. Pat. No. 9,917,856, IPR No. Unassigned, *Keysight Technologies, Inc.* v. *Centripetal Networks, Inc.*, Declaration of Dr. Doug W. Jacobson in Support of Inter Partes Review of U.S. Pat. No. 9,917,856 ("Jacobson"), 157 pages.
Aug. 3, 2022—Patent Owner's Notice of Taking Deposition of Dr. Jon Weissman, Case IPR2022-00182, U.S. Pat. No. 9,917,856, 3 pages.
Aug. 3, 2022—Petitioner's Updated List of Exhibits, IPR2022-00182, U.S. Pat. No. 9,917,856, 9 pages.
Exhibit 1047—Declaration of Andrew Radsch in Support of Motion for Pro Hac Vice Admission dated Aug. 2, 2022, as listed in Petitioner's Updated List of Exhibits dated Aug. 3, 2022, Case IPR2022-00182, U.S. Pat. No. 3,917,856, 4 pages.
Exhibit 1048—Declaration of Keyna Chow in Support of Motion for Pro Hac Vice Admission dated Aug. 2, 2022, as listed in Petitioner's Updated List of Exhibits dated Aug. 3, 2022, Case IPR2022-00182, U.S. Pat. No. 9,917,856, 5 pages.
Jul. 22, 2022—Patent Owner's Opposition to Petitioner's Motion for Joinder, Case IPR2022-01151, U.S. Pat. No. 3,917,856, 23 pages.
Exhibit 2001—Amended Complaint for Patent Infringement, *Centripetal Networks, Inc.* v. *Keysight Technologies, Inc. and Ixia*, No. 2:17-cv-00383, Dkt. No. 192 (E.D. Va. Jun. 13, 2018), as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 1,917,856, 82 pages.
Exhibit 2002—Invalidity Chart for U.S. Pat. No. 9,917,856, and U.S. Pat. No. 7,185,386, *Centripetal Networks, Inc.* v. *Keysight Technologies, Inc., and Ixia*, No. 2:17-cv-00383 (E.D. Va.)—Centripetal-CSCO 172221 -349, as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 9,917,856, 129 pages.
Exhibit 2003—Expert Report of Adam Sorini Regarding invalidity of U.S. Pat. No. 9,137,205, U.S. Pat. No. 9,264,370, U.S. Pat. No. 9,413,722, U.S. Pat. No. 9,565,213, U.S. Pat. No. 9,917,856 and U.S. Pat. No. 9,560,077 (including Appendices), *Centripetal Networks, Inc.* v. *Keysight Technologies, Inc., and Ixia*, No. 2:17-cv-00383 (E.D. Va. Jul. 30, 2018)—Centripetal—Csco 087501-88046, dated Jul. 30, 2018, as listed in Patent Owner's Opposition to Petitioner's Motion for Joinder, dated Jul. 22, 2022, Case IPR2022-01151, U.S. Pat. No. 9,917,856, and Patent Owner's Opposition to

(56) References Cited

OTHER PUBLICATIONS

Petitioner's Motion for Joinder, dated Jul. 22, 2022, Case IPR202201199, U.S. Pat. No. 9,917,856, 546 pages.
Exhibit 2004—Minutes of Proceedings, *Centripetal Networks, Inc.* v. *Keysight Technologies, Inc., and Ixia*, No. 2:17-v-00383, Dkt. No. 581 (E.D. Va. Oct. 9, 2018), dated Oct. 9, 2018, as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 9,917,856, 1 page.
Exhibit 2005—Amended Complaint for Patent Infringement, *Centripetal Networks, Inc.* v. *Cisco Systems, Inc.*, No. 2:18-cv-00094, Dkt. No. 29 (E.D. Va. Mar. 29, 2018), as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 9,917,856, 184 pages.
Exhibit 2006—Order, *Centripetal Networks, Inc.* v. *Cisco Systems, Inc.*, No. 2:18-cv-00094, Dkt. No. 68 (E.D. Va. Sep. 18, 2019), dated Sep. 18, 2019, as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 9,917,856, 7 pages.
Exhibit 2007—Declaration of Hannah Lee in Support of Patent Owner's Opposition to Petitioner's Motion for Joinder dated Jul. 22, 2022, as cited in Patent Owner's Opposition to Petitioner's Motion for Joinder, dated Jul. 22, 2022, Case IPR2022-01151, U.S. Pat. No. 9,917,856, 3 pages.
Exhibit 2008—Defendants Keysight Technologies, Inc. and Ixia's Identification of Prior Art, *Centripetal Networks, Inc.* v. *Keysight Technologies, Inc., and Ixia*, Civil Action No. 2:17-cv-00383 (E.D. Va. Jul. 5, 2018), dated Jul. 5, 2018, as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 9,917,856, 4 pages.
Exhibit 2009—Demonstrative Exhibit DDX2—Adam Sorini Direct Examination, *Centripetal Networks, Inc.* v. *Keysight Technologies, Inc., and Ixia*, No. 2:17-cv-00383 (E.D. Va.), as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder, dated Jul. 22, 2022, Case IPR2022-01199, U.S. Pat. No. 9,917,856, 345 pages.
Exhibit 2010—Email from S. McKeown to J. Hannah re Precedential Opinion Panel Review for IPR2022-00182, dated Jun. 30, 2022, as listed in Patent Owner's Opposition to Petitioner's Motion for Joinder, dated Jul. 22, 2022, Case IPR2022-01151, U.S. Pat. No. 9,917,856), and Patent Owner's Opposition to Petitioner's Motion for Joinder, dated Jul. 22, 2022, Case IPR2022-01199, U.S. Pat. No. 9,917,856, 4 pages.
Exhibit 2011—Statement of Jonathan Rogers (COO, Centripetal Networks, Inc.) Before the Subcommittee on Courts, Intellectual Property, and the Internet—Committee on the Judiciary United States House of Representatives (Jun. 23, 2002), Hearing on The Patent Trial and Appeal Board After 10 Years: Impact on Innovation and Small Business, <https://www.congress.gov/117/meeting/house/114937/witnesses/HHRG-117-JU03-Wstate-RogersJ-20220623.pdf>>, as listed in Patent Owner's Opposition to Petitioner's Motion for Joinder, dated Jul. 22, 2022, Case IPR2022-01151, U.S. Pat. No. 9,917,856, and Patent Owner's Opposition to Petitioner's Motion for Joinder dated Jul. 22, 2022, Case IPR2022-01199, U.S. Pat. No. 9,917,856, 11 pages.
Jul. 22, 2022—Patent Owner's Opposition to Petitioner's Motion for Joinder, Case IPR2022-01199, U.S. Pat. No. 9,917,856, 22 pages.
Exhibit 2007—Declaration of Hannah Lee in Support of Patent Owner's Opposition to Petitioner's Motion for Joinder, dated Jul. 22, 2022, Case IPR2022-01199, U.S. Pat. No. 9,917,856, as cited in Patent Owner's Opposition to Petitioner's Motion for Joinder, Case IPR2022-01199, U.S. Pat. No. 9,917,856, dated Jul. 22, 2022, 3 pages.

* cited by examiner

RULE-BASED NETWORK-THREAT DETECTION FOR ENCRYPTED COMMUNICATIONS

CROSS-REFERENCE TO RELATED APPLICATION(S)

The present application is a continuation of U.S. patent application Ser. No. 15/877,608, filed Jan. 23, 2018, which is a continuation of co-pending U.S. patent application Ser. No. 14/757,638, filed Dec. 23, 2015, the contents of which are hereby incorporated by reference in its entirety.

BACKGROUND

Network security is becoming increasingly important as the information age continues to unfold. Network threats may take a variety of forms (e.g., unauthorized requests or data transfers, viruses, malware, large volumes of traffic designed to overwhelm resources, and the like). Network-threat services provide information associated with network threats, for example, reports that include listings of network-threat indicators (e.g., network addresses, domain names, uniform resource identifiers (URIs), and the like). Such information may be utilized to identify network threats. Encrypted communications, however, may obfuscate data corresponding to network threats. Accordingly, there is a need for rule-based network-threat detection for encrypted communications.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to rule-based network-threat detection for encrypted communications. In accordance with embodiments of the disclosure, a packet-filtering system configured to filter packets in accordance with packet-filtering rules may receive data indicating network-threat indicators and may configure the packet-filtering rules to cause the packet-filtering system to identify packets comprising unencrypted data, and packets comprising encrypted data. A portion of the unencrypted data may correspond to one or more of the network-threat indicators, and the packet-filtering rules may be configured to cause the packet-filtering system to determine, based on the portion of the unencrypted data, that the packets comprising encrypted data correspond to the one or more network-threat indicators.

BRIEF DESCRIPTION OF THE DRAWINGS

The present disclosure is pointed out with particularity in the appended claims.

Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 1 depicts an illustrative environment for rule-based network-threat detection for encrypted communications in accordance with one or more aspects of the disclosure;

FIG. 2 depicts an illustrative packet-filtering system for rule-based network-threat detection for encrypted communications in accordance with one or more aspects of the disclosure;

Figure 5A:
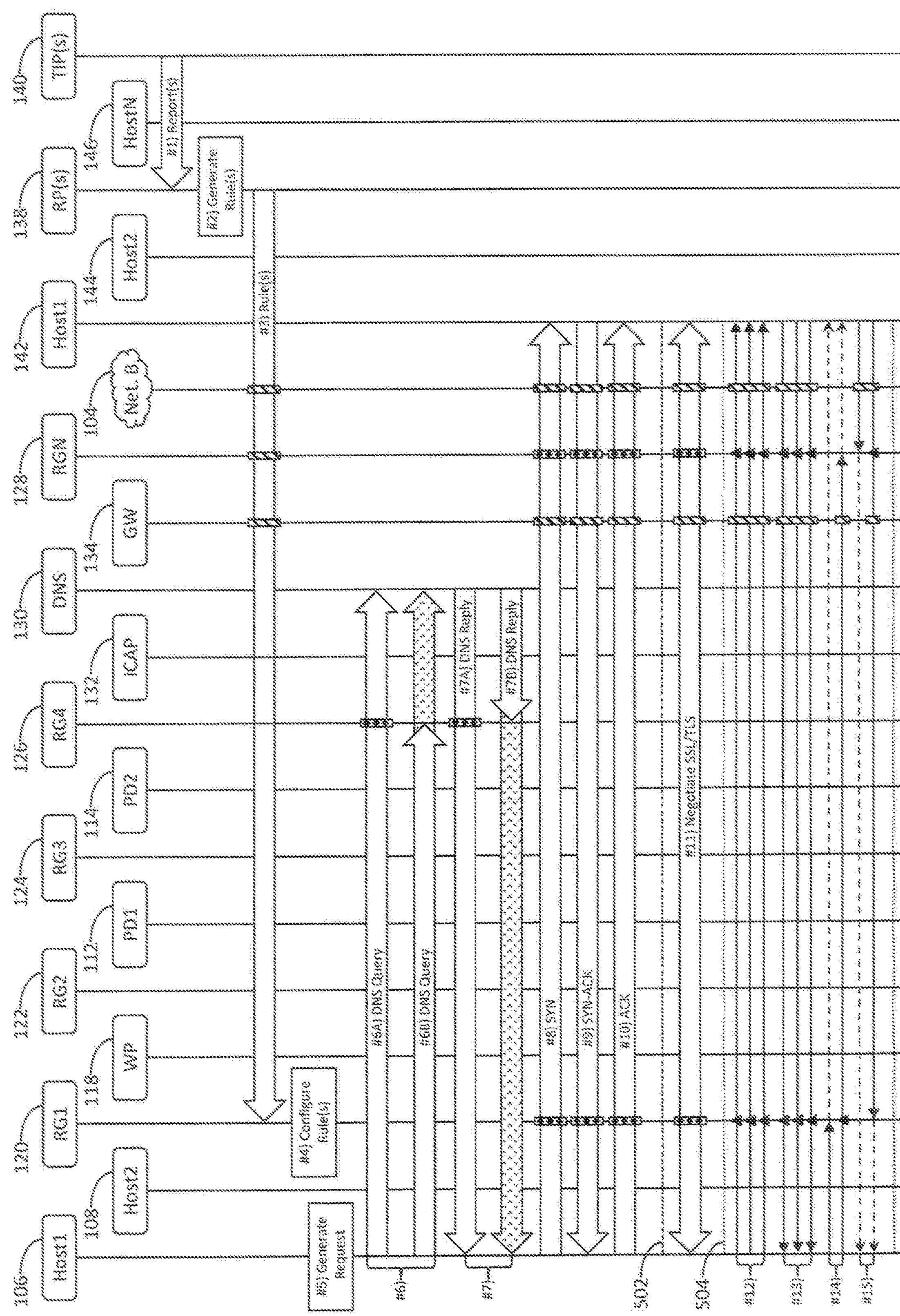
Figure 5B:
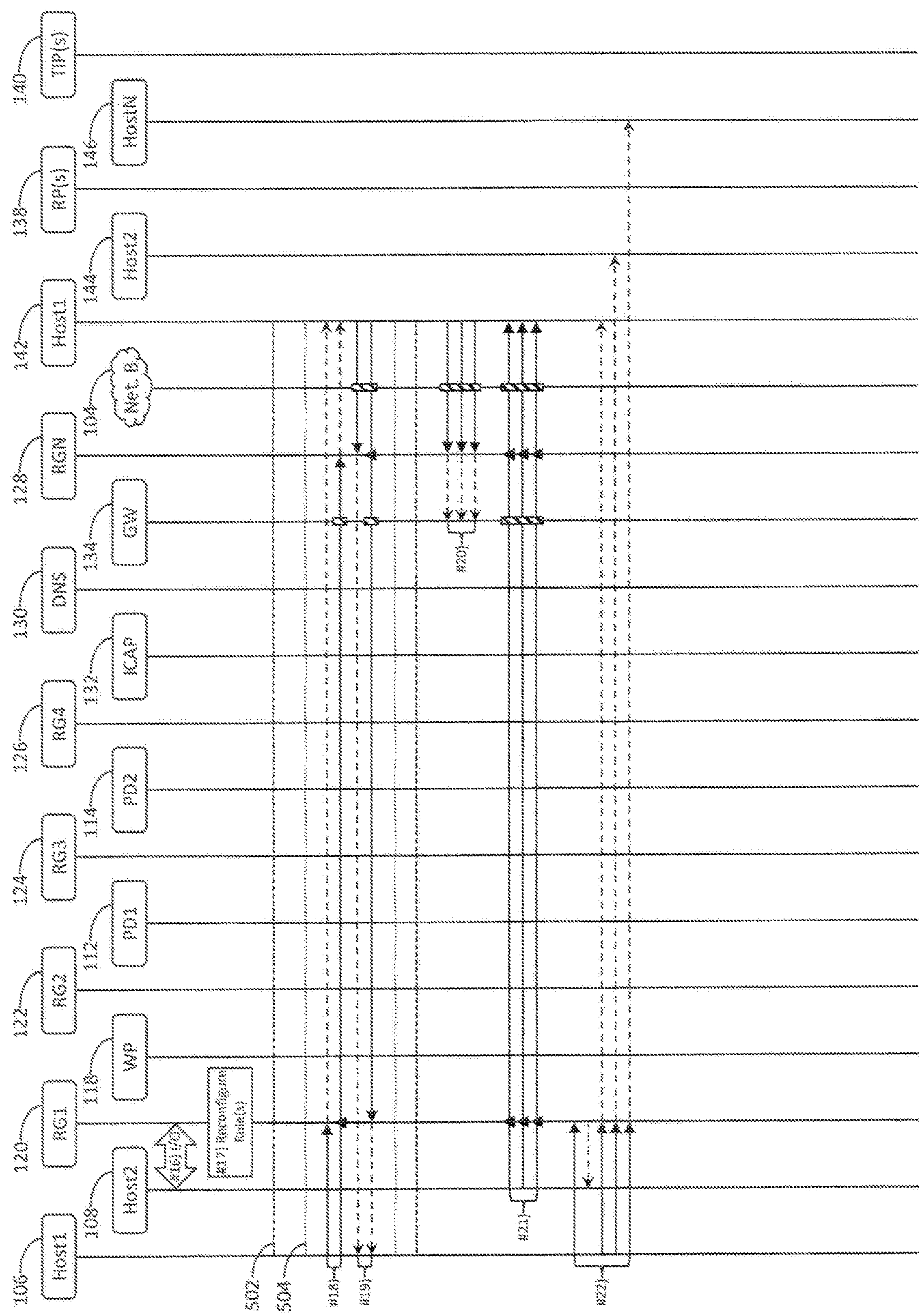
Figure 6A:
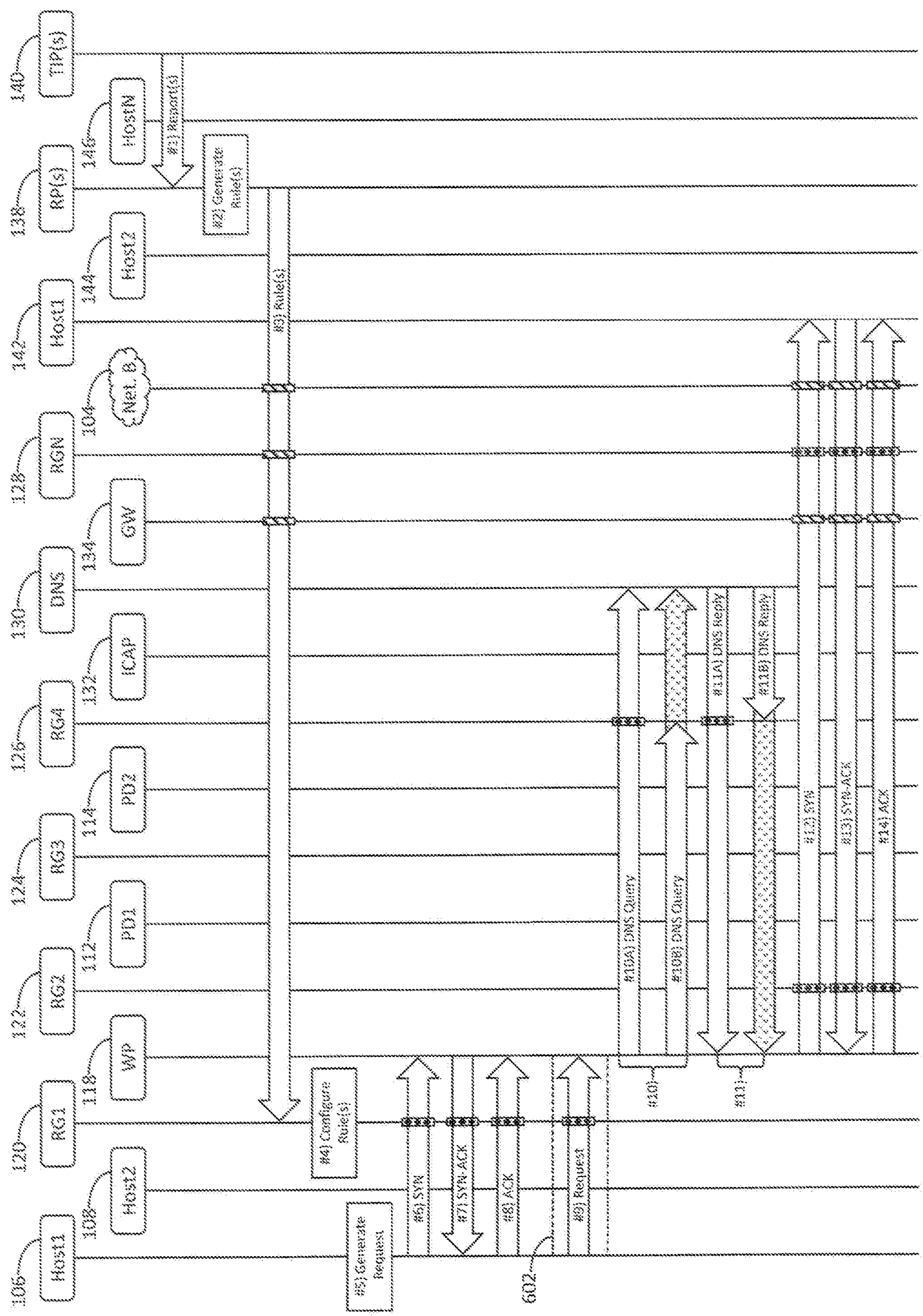
Figure 6B:
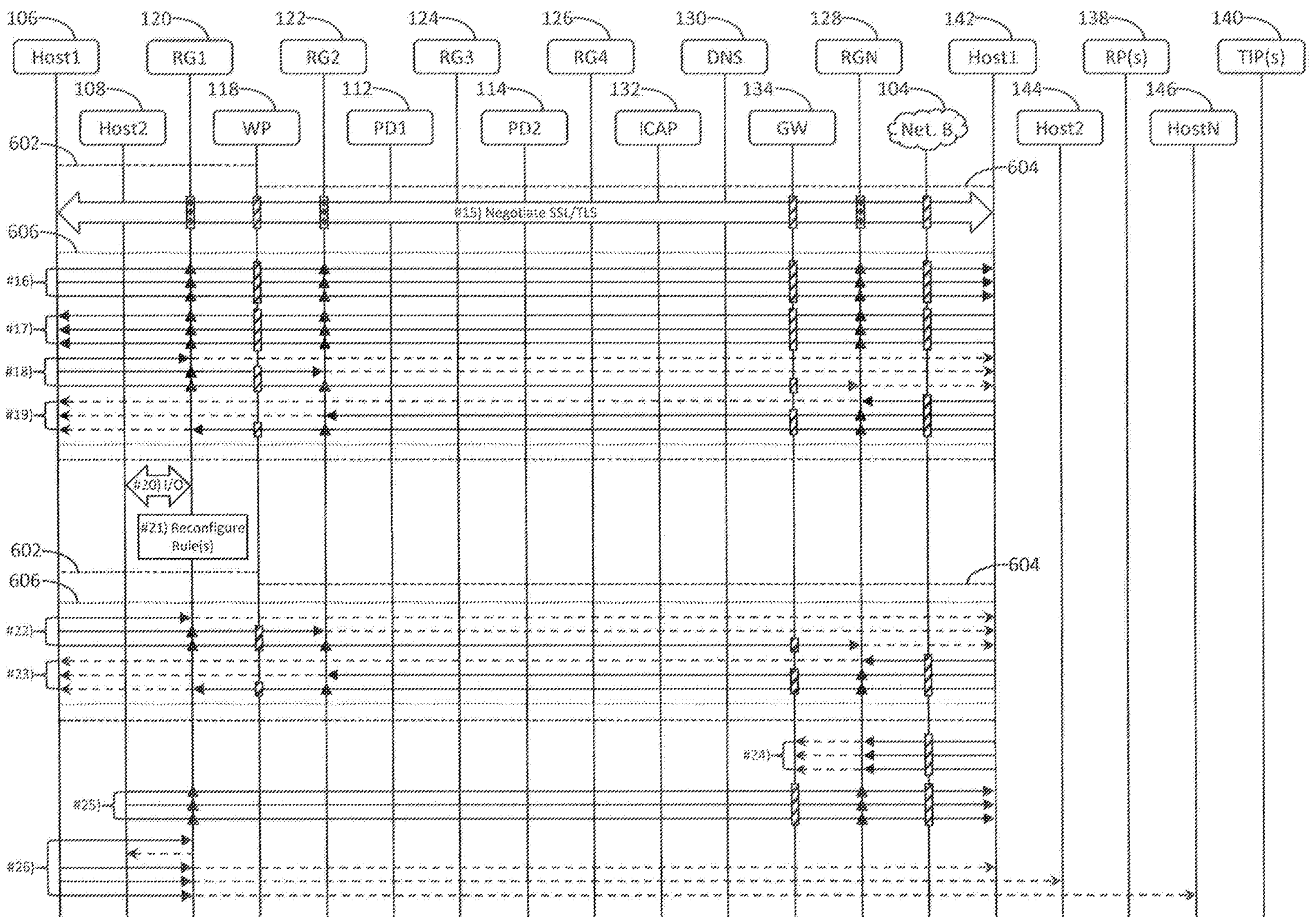
Figure 7:
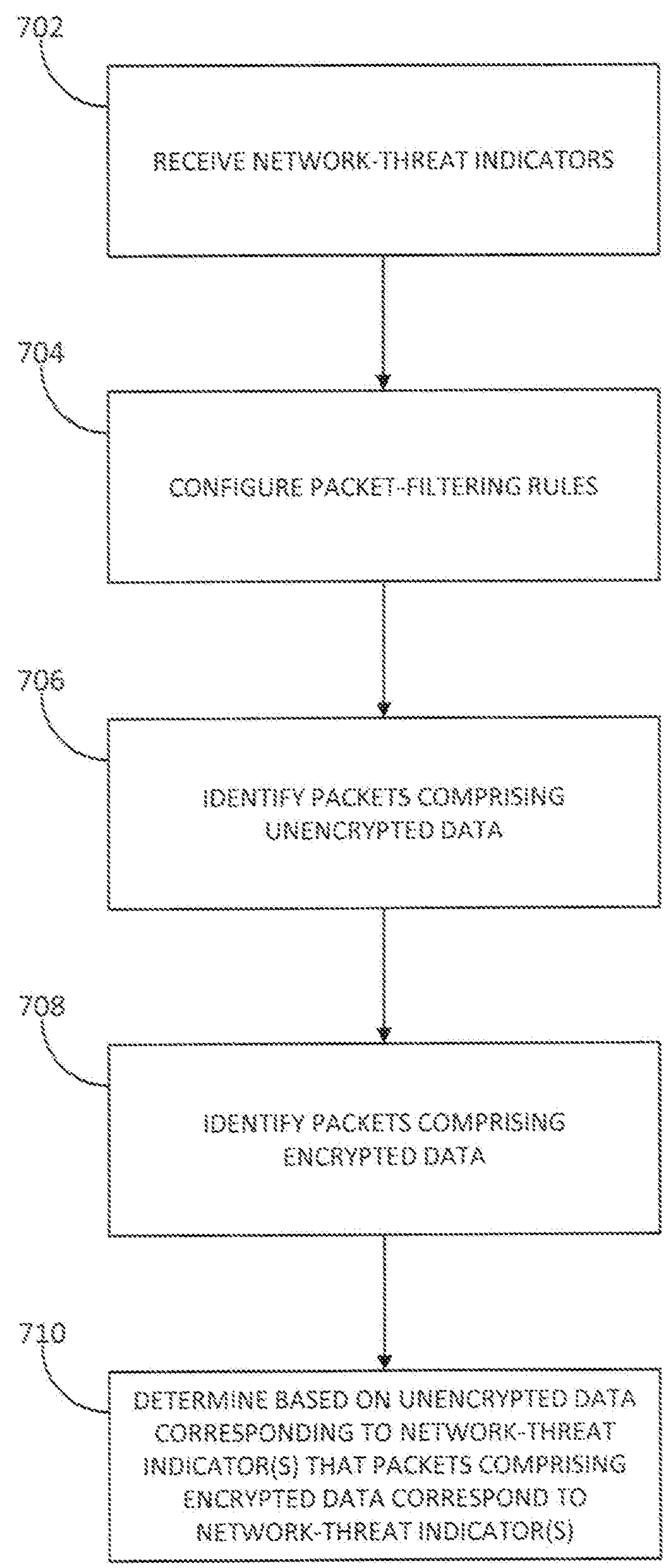

FIGS. 3A-C, 4A-C, 5A-B, and 6A-B depict illustrative event sequences for rule-based network-threat detection for encrypted communications in accordance with one or more aspects of the disclosure; and FIG. 7 depicts an illustrative method for rule-based network-threat detection for encrypted communications in accordance with one or more aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure.

Various connections between elements are discussed in the following description.

These connections are general and, unless specified otherwise, may be direct or indirect, wired or wireless. In this respect, the specification is not intended to be limiting.

Figure 1:
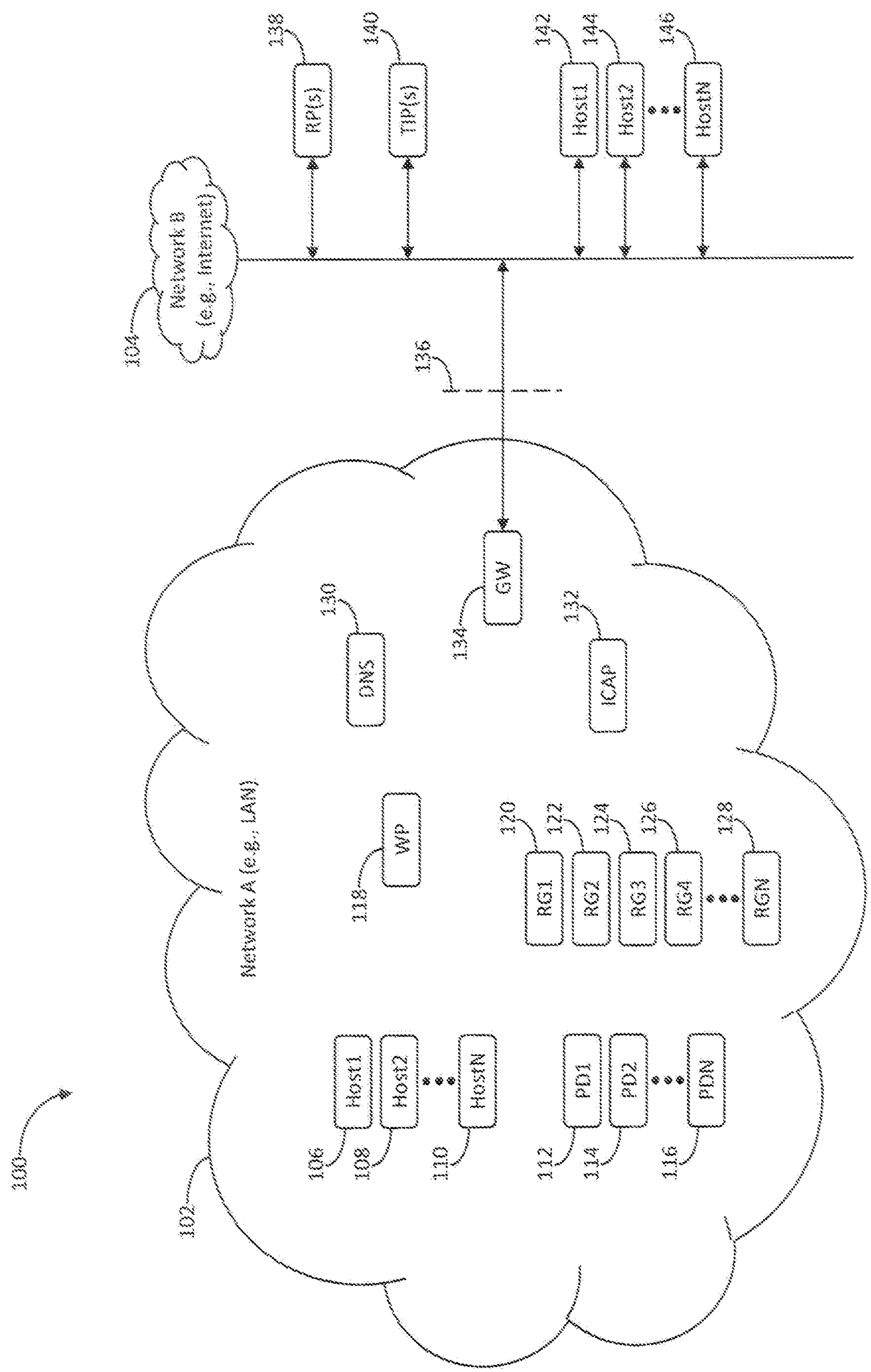

FIG. 1 depicts an illustrative environment for rule-based network-threat detection for encrypted communications in accordance with one or more aspects of the disclosure. Referring to FIG. 1, environment 100 may include networks 102 and 104. Network 102 may comprise one or more networks (e.g., Local Area Networks (LANs), Wide Area Networks (WANs), Virtual Private Networks (VPNs), or combinations thereof) associated with one or more individuals or entities (e.g., governments, corporations, service providers, or other organizations). Network 104 may comprise one or more networks (e.g., LANs, WANs, VPNs, or combinations thereof) that interface network 102 with one or more other networks (not illustrated). For example, network 104 may comprise the Internet, a similar network, or portions thereof.

Environment 100 may also include one or more hosts, such as computing or network devices (e.g., servers, desktop computers, laptop computers, tablet computers, mobile devices, smartphones, routers, gateways, firewalls, switches, access points, or the like). For example, network 102 may include hosts 106, 108, and 110, proxy devices 112, 114, and 116, web proxy 118, rule gates 120, 122, 124, 126, and 128, domain name system (DNS) 130, Internet content adaptation protocol (ICAP) server 132, and gateway 134. As used herein, "host" (or "hosts") refers to any type of network device (or node) or computing device; while such devices may be assigned (or configured to be assigned) one or more network-layer addresses, the term "host" (or "hosts") does not imply such devices necessarily are assigned (or configured to be assigned) one or more network-layer addresses.

Gateway 134 may be located at border 136 between networks 102 and 104 and may interface network 102 or one or more hosts located therein with network 104 or one or more hosts located therein. For example, network 104 may include one or more rule providers 138, one or more threat-intelligence providers 140, and hosts 142, 144, and 146, and gateway 134 may interface hosts 106, 108, and 110, proxy devices 112, 114, and 116, web proxy 118, rule gates 120, 122, 124, 126, and 128, DNS 130, and ICAP server 132 with rule providers 138, threat-intelligence providers 140, and hosts 142, 144, and 146.

Figure 2:
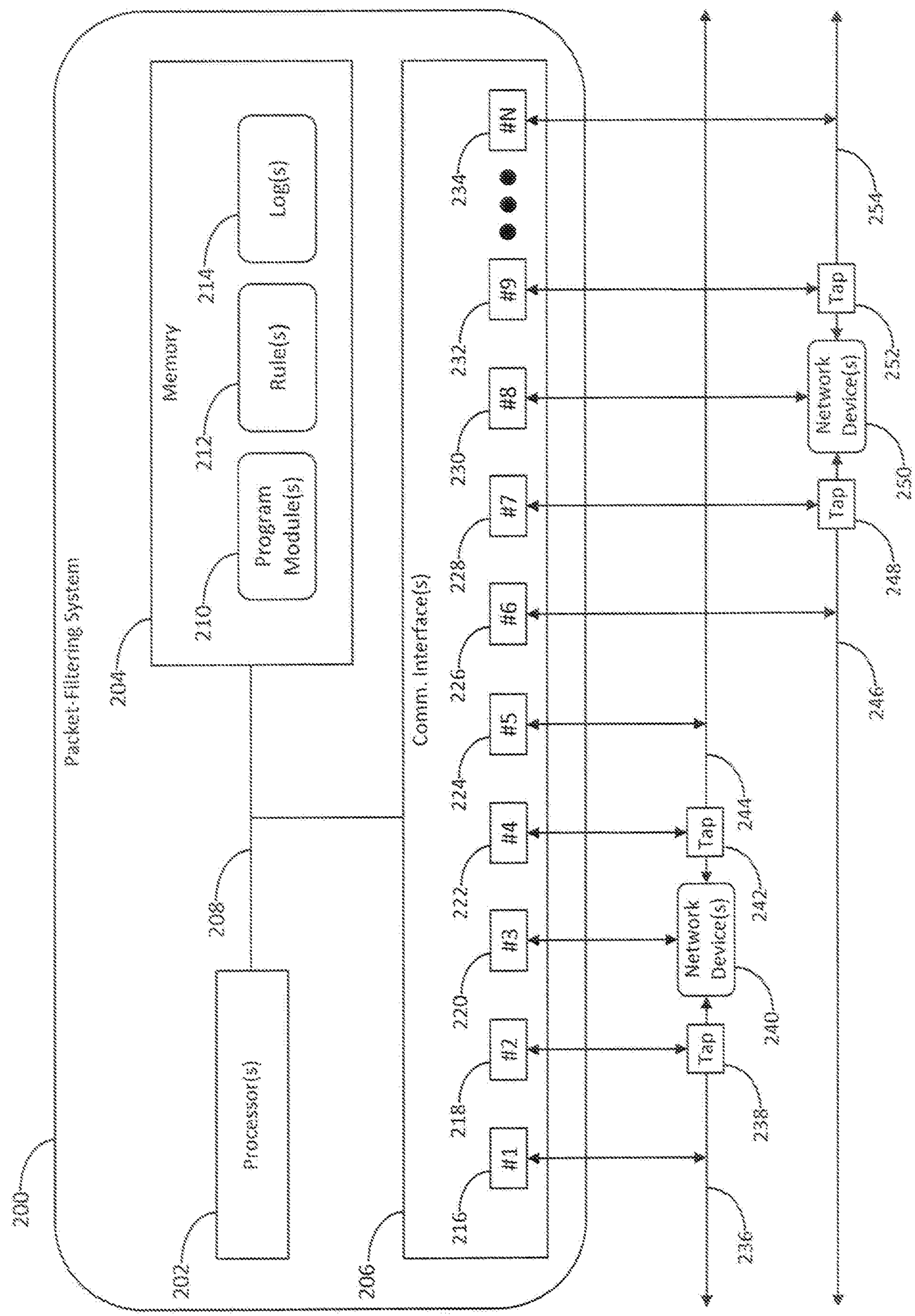

FIG. 2 depicts an illustrative packet-filtering system for rule-based network-threat detection for encrypted communications in accordance with one or more aspects of the disclosure. Referring to FIG. 2, packet-filtering system 200 may be associated with network 102 and may include one or more of rule gates 120, 122, 124, 126, and 128. Packet-filtering system 200 may comprise one or more processors 202, memory 204, one or more communication interfaces 206, and data bus 208. Data bus 208 may interface processors 202, memory 204, and communication interfaces 206. Memory 204 may comprise one or more program modules 210, rules 212, and logs 214. Program modules 210 may comprise instructions that when executed by processors 202 cause packet-filtering system 200 to perform one or more of the functions described herein. Rules 212 may comprise one or more packet-filtering rules in accordance with which packet-filtering system 200 is configured to filter packets received via communication interfaces 206. Logs 214 may include one or more entries generated by processors 202 in accordance with rules 212 for packets received by packet-filtering system 200 via communication interfaces 206.

Communication interfaces 206 may interface packet-filtering system 200 with one or more communication links of environment 100 (e.g., of networks 102 and 104). In some embodiments, one or more of communication interfaces 206 may interface directly with a communication link of environment 100. For example, interfaces 216 and 224 may interface directly with links 236 and 244, respectively. In some embodiments, one or more of communication interfaces 206 may interface indirectly with a communication link of environment 100. For example, interface 220 may interface with links 236 and 244 via one or more network devices 240. Network devices 240 may provide interface 220 with access to (or copies of) packets traversing one or more of links 236 and 244, for example, via a switched port analyzer (SPAN) port of network devices 240. Additionally or alternatively, interfaces 218 and 222 may interface with links 236 and 244 via tap devices 238 and 242. For example, packet-filtering system 200 may provision tap device 238 with one or more of rules 212 configured to cause tap device 238 to identify packets traversing link 236 that correspond to specified criteria and route (or forward) the packets (or copies thereof) to interface 218, and packet-filtering system 200 may provision tap device 242 with one or more of rules 212 configured to cause tap device 242 to identify packets traversing link 244 that correspond to specified criteria and route (or forward) the packets (or copies thereof) to interface 222. Similarly, interfaces 226 and 234 may interface directly with links 246 and 254, respectively; network devices 250 may provide interface 230 with access to (or copies of) packets traversing one or more of links 246 and 254; packet-filtering system 200 may provision tap device 248 with one or more of rules 212 configured to cause tap device 248 to identify packets traversing link 246 that correspond to specified criteria and route (or forward) the packets (or copies thereof) to interface 228; and packet-filtering system 200 may provision tap device 252 with one or more of rules 212 configured to cause tap device 252 to identify packets traversing link 254 that correspond to specified criteria and route (or forward) the packets (or copies thereof) to interface 232. In some embodiments, packet-filtering system 200 may comprise one or more of tap devices 238, 242, 248, and 252 or network devices 240 and 250.

FIGS. 3A-C, 4A-C, 5A-B, and 6A-B depict illustrative event sequences for rule-based network-threat detection for encrypted communications in accordance with one or more aspects of the disclosure. The depicted steps are merely illustrative and may be omitted, combined, or performed in an order other than that depicted; the numbering of the steps is merely for ease of reference and does not imply any particular ordering is necessary or preferred.

Figure 3A:
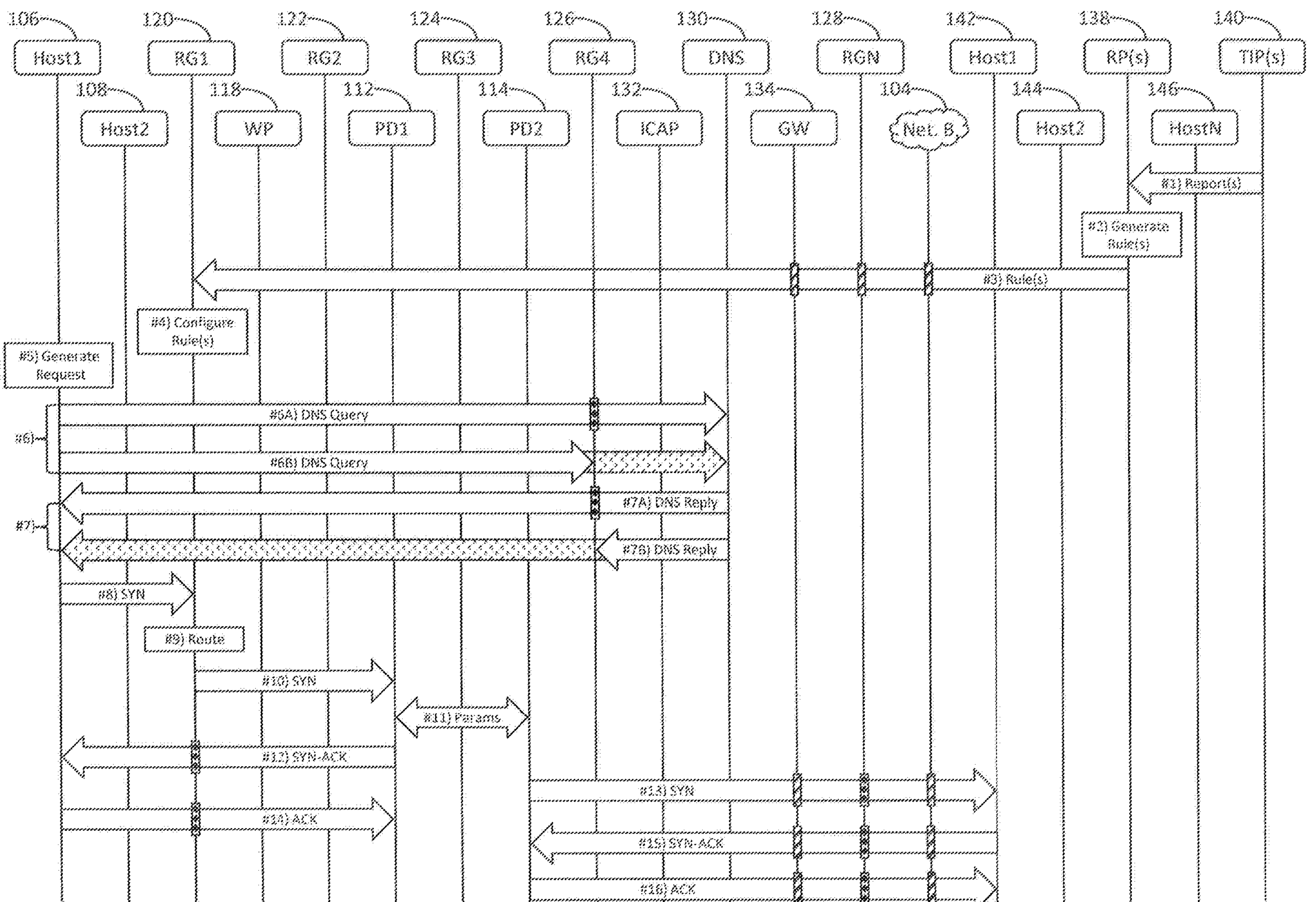

Referring to FIG. 3A, at step #1, threat-intelligence providers 140 may communicate one or more threat-intelligence reports to rule providers 138. The threat-intelligence reports may include one or more network-threat indicators, for example, domain names (e.g., fully qualified domain names (FQDNs)), URIs, network addresses, or the like. At step #2, rule providers 138 may utilize the threat-intelligence reports to generate one or more packet-filtering rules configured to identify packets comprising data corresponding to the network-threat indicators. At step #3, rule providers 138 may communicate the packet-filtering rules to rule gate 120. As indicated by the crosshatched boxes over the lines extending downward from network 104, rule gate 128, and gateway 134, the packet-filtering rules may traverse network 104, rule gate 128, and gateway 134. For example, network 104 and gateway 134 may interface rule providers 138 and rule gate 120, and rule gate 128 may interface a communication link interfacing network 104 and gateway 134. Rule gate 120 may receive the packet-filtering rules generated by rule providers 138 and, at step #4, may utilize the received packet-filtering rules to configure rules 212 to cause packet-filtering system 200 to identify packets comprising data corresponding to at least one of the plurality of network-threat indicators.

At step #5, host 106 may generate a request. For example, host 106 may execute a web browser, and the web browser may generate a request in response to user input (e.g., navigation of the web browser to a URI). The request may comprise a domain name, and host 106 may generate a DNS query comprising the domain name and, at step #6, may communicate the DNS query toward DNS 130. Rule gate 126 may interface a communication link interfacing host 106 and DNS 130, the domain name included in the request may correspond to one or more of the network-threat indicators, and rules 212 may be configured to cause rule gate 126 to one or more of identify one or more packets comprising the DNS query, determine that the packets comprise the domain name corresponding to the network-threat indicators, and responsive to one or more of identifying the packets or determining that the packets comprise the domain name corresponding to the network-threat indicators, one or more of log (as indicated by the diamond-patterned box over the line extending downward from rule gate 126) or drop the packets. Rule gate 126 may generate log data (e.g., one or more entries in logs 214) for the packets. For example, the packets may comprise a network address of host 106 (e.g., as a source address in their network-layer headers), and rule gate 126 may generate log data indicating the network address of host 106. As depicted by step #6A, the packets may be communicated to DNS 130. In some embodiments, rules 212 may be configured to cause rule gate 126 to, responsive to one or more of identifying the packets or determining that the packets comprise the domain name corresponding to the network-threat indicators, drop the packets, preventing them from reaching DNS 130, as depicted by step #6B.

DNS 130 may generate a reply to the DNS query and, at step #7, may communicate the reply toward host 106. The reply may comprise the domain name corresponding to the network-threat indicators, and rules 212 may be configured to cause rule gate 126 to one or more of identify one or more packets comprising the reply, determine that the packets comprise the domain name corresponding to the network-threat indicators, and responsive to one or more of identifying the packets or determining that the packets comprise the domain name corresponding to the network-threat indicators, one or more of log or drop the packets. Rule gate 126 may generate log data (e.g., one or more entries in logs 214) for the packets. For example, the packets may comprise the network address of host 106 (e.g., as a destination address in their network-layer headers), and rule gate 126 may generate log data indicating the network address of host 106. Similarly, the domain name may correspond to host 142, the packets may comprise a network address of host 142 (e.g., DNS 130 may have resolved the domain name included in the query to the network address of host 142.), and rule gate 126 may generate log data indicating the network address of host 142. As depicted by step #7A, the packets may be communicated to host 106. In some embodiments, rules 212 may be configured to cause rule gate 126 to, responsive to determining that the packets comprise the domain name corresponding to the network-threat indicators, drop the packets, preventing them from reaching host 106, as depicted by step #7B.

Packet-filtering system 200 may be configured to correlate packets identified by packet-filtering system 200 (e.g., the packets comprising the reply to the DNS query) with packets previously identified by packet-filtering system 200 (e.g., the packets comprising the DNS query). For example, packet-filtering system 200 may be configured to determine that packets identified by packet-filtering system 200 (e.g., the packets comprising the reply to the DNS query) are one or more of associated with, related to, or the product of packets previously identified by packet-filtering system 200 (e.g., the packets comprising the DNS query). Packet-filtering system 200 may be configured to correlate packets identified by packet-filtering system 200 with packets previously identified by packet-filtering system 200 based on data stored in logs 214 (e.g., the log data generated by rule gate 126 in steps #6 and #7).

For example, for one or more packets logged by packet-filtering system 200 (e.g., the packets comprising the DNS query or the packets comprising the reply to the DNS query), logs 214 may comprise one or more entries indicating one or more of network-layer information (e.g., information derived from one or more network-layer header fields of the packets, such as a protocol type, a destination network address, a source network address, a signature or authentication information (e.g., information from an Internet protocol security (IPsec) encapsulating security payload (ESP)), or the like), transport-layer information (e.g., a destination port, a source port, a checksum or similar data (e.g., error detection or correction values, such as those utilized by the transmission control protocol (TCP) or the user datagram protocol (UDP)),or the like), application-layer information (e.g., information derived from one or more application-layer header fields of the packets, such as a domain name, a uniform resource locator (URL), a uniform resource identifier (URI), an extension, a method, state information, media-type information, a signature, a key, a timestamp, an application identifier, a session identifier, a flow identifier, sequence information, authentication information, or the like), other data in the packets (e.g., payload data), or one or more environmental variables (e.g., information associated with but not solely derived from the packets themselves, such as one or more arrival (or receipt) or departure (or transmission) times of the packets (e.g., at or from one or more of rule gates 120, 122, 124, 126, or 128, tap devices 238, 242, 248, or 252, or network devices 240 or 250), one or more ingress or egress identifiers (e.g., associated with one or more physical or logical network interfaces, ports, or communication-media types of one or more of rule gates 120, 122, 124, 126, or 128, tap devices 238, 242, 248, or 252, or network devices 240 or 250 via which the packets were one or more of received or transmitted), one or more device identifiers (e.g., associated with one or more of rule gates 120, 122, 124, 126, or 128, tap devices 238, 242, 248, or 252, or network devices 240 or 250 via which the packets were one or more of received or transmitted), or the like), and packet-filtering system 200 may utilize such entries to correlate one or more packets identified by packet-filtering system 200 with one or more packets previously identified by packet-filtering system 200.

In some embodiments, packet-filtering system 200 may implement one or more aspects of the technology described in U.S. patent application Ser. No. 14/618,967, filed Feb. 10, 2015, and entitled "CORRELATING PACKETS IN COMMUNICATIONS NETWORKS," the disclosure of which is incorporated by reference herein in its entirety and made part hereof, or similar technology (e.g., to correlate one or more packets identified by packet-filtering system 200 with one or more packets previously identified by packet-filtering system 200).

Host 106 may generate one or more packets destined for host 142 comprising data (e.g., a TCP: SYN handshake message) configured to establish a connection (e.g., a TCP connection or tunnel) between hosts 106 and 142 and, at step #8, may communicate the packets toward host 142. Rule gate 120 may interface a communication link interfacing hosts 106 and 142, and rules 212 may be configured to cause rule gate 120 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #6 or #7).

At step #9, rule gate 120 may route the packets comprising the data configured to establish the connection between hosts 106 and 142 to proxy device 112 and, at step #10, may communicate the packets to proxy device 112. For example, rules 212 may be configured to cause rule gate 120 to route the packets to proxy device 112 based on data in the packets, for example, one or more ports (e.g., port 443) indicated by transport-layer headers in the packets, indicating the connection between hosts 106 and 142 will be utilized to establish an encrypted communication session or tunnel (e.g., a session established in accordance with the transport layer security (TLS) protocol, secure sockets layer (SSL) protocol, secure shell (SSH) protocol, or the like). In some embodiments, rules 212 may be configured to cause rule gate 120 to route the packets to proxy device 112 based on a determination that one or more of hosts 106 or 142 is associated with a network address for which rules 212 indicate encrypted communications should be established via one or more of proxy devices 112, 114, or 116. For example, proxy devices 112, 114, and 116 may be part of a proxy system (e.g., a SSL/TLS proxy system) that enables packet-filtering system 200 to filter packets comprising encrypted data based on information within the encrypted data, and rules 212 may be configured to cause rule gate 120 to route the packets to proxy device 112 based on a determination that host 142 is associated with a network address of a domain corresponding to the network-threat indicators.

Additionally or alternatively, network 102 may include one or more hosts for which rules 212 indicate connections utilized to establish encrypted communication sessions (e.g., connections with hosts corresponding to network-threat indicators) should be established via one or more of proxy devices 112, 114, or 116, as well as one or more hosts for which rules 212 indicate connections utilized to establish encrypted communication sessions should not be established via one or more of proxy devices 112, 114, and 116, for example, hosts that generate sensitive data (e.g., personally identifiable information (PIO), inspection of which may present privacy or regulatory concerns (e.g., data subject to the health insurance portability and accountability act (HIPAA), or the like), and rules 212 may be configured to cause rule gate 120 to route the packets to proxy device 112 based on a determination that host 106 is associated with a network address for which rules 212 indicate encrypted communications should be established via one or more of proxy devices 112, 114, or 116.

For example, link 236 may interface host 106 with rule gate 120, link 244 may interface rule gate 120 with host 142, link 246 may interface rule gate 120 with proxy device 112, link 254 may interface proxy devices 112 and 114 and may comprise a communication link internal to a proxy system comprising proxy devices 112 and 114, and rules 212 may be configured to cause rule gate 120 to route (or redirect) packets received from host 106 via one or more of interfaces 216, 218, or 220 and destined for host 142 (or a portion thereof (e.g., packets comprising data configured to establish a connection between hosts 106 and 142 and indicating the connection will be utilized to establish an encrypted communication session)) to host 142 via interface 226. Additionally or alternatively, rules 212 may be configured to cause rule gate 120 to forward copies of (or mirror) packets received from host 106 via one or more of interfaces 216, 218, 220, or 222 and destined for host 142 (or a portion thereof (e.g., packets comprising data configured to establish a connection between hosts 106 and 142 and indicating the connection will be utilized to establish an encrypted communication session)) to proxy device 112 via interface 226.

At step #11, proxy devices 112 and 114 may exchange one or more parameters determined from the packets comprising the data configured to establish the connection between hosts 106 and 142, for example, one or more network addresses in network-layer headers of the packets (e.g., network addresses of hosts 106 and 142) or ports indicated by transport-layer headers in the packets (e.g., indicating the type of encrypted communication session the connection will be utilized to establish). Proxy device 112 may utilize the parameters to generate packets comprising data configured to establish a connection between proxy device 112 and host 106 (e.g., a TCP: SYN-ACK handshake message) and, at step #12, may communicate the packets to host 106. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #6 or #7), and one or more of log or drop the packets.

Similarly, proxy device 114 may utilize the parameters to generate packets comprising data configured to establish a connection between proxy device 114 and host 142 (e.g., a TCP: SYN handshake message) and, at step #13, may communicate the packets to host 142. Rule gate 128 may interface a communication link interfacing proxy device 114 and host 142, and rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of steps #6, #7, or #12), and one or more of log or drop the packets.

Responsive to receiving the packets from proxy device 112, host 106 may generate packets comprising data configured to establish the connection between proxy device 112 and host 106 (e.g., a TCP: ACK handshake message) and, at step #14, may communicate the packets to proxy device 112. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of steps #6, #7, #12, or #13), and one or more of log or drop the packets.

Responsive to receiving the packets from proxy device 114, host 142 may generate packets comprising data configured to establish the connection between proxy device 114 and host 142 (e.g., a TCP: SYN-ACK handshake message) and, at step #15, may communicate the packets to proxy device 114. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-14), and one or more of log or drop the packets.

Responsive to receiving the packets from host 142, proxy device 114 may generate packets comprising data configured to establish the connection between proxy device 114 and host 142 (e.g., a TCP: ACK handshake message) and, at step #16, may communicate the packets to host 142. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-15), and one or more of log or drop the packets.

Figure 3B:
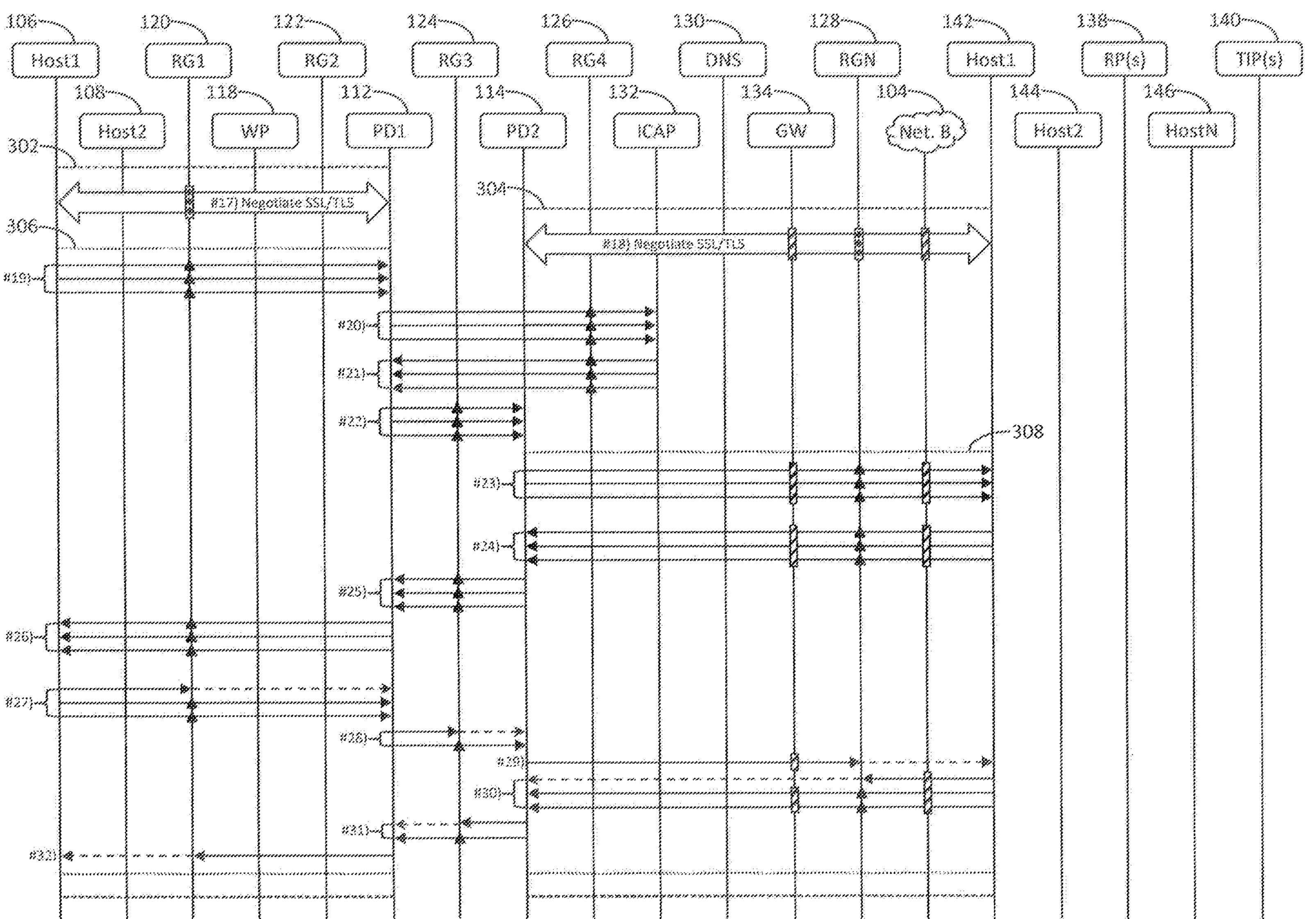

Referring to FIG. 3B, proxy device 112 may receive the packets comprising data configured to establish the connection between proxy device 112 and host 106 communicated by host 106 in step #14, and connection 302 (e.g., a TCP connection) between proxy device 112 and host 106 may be established. Similarly, host 142 may receive the packets comprising data configured to establish the connection between proxy device 114 and host 142 communicated by proxy device 114 in step #16, and connection 304 (e.g., a TCP connection) between proxy device 114 and host 142 may be established.

At step #17, proxy device 112 and host 106 may communicate packets comprising data configured to establish encrypted communication session 306 (e.g., a SSL/TLS session) between proxy device 112 and host 106 via connection 302. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-16), and one or more of log or drop the packets. Additionally or alternatively, rules 212 may be configured to cause rule gate 120 to one or more of identify the packets or determine that the packets comprise data corresponding to the network-threat indicators based on data included in the packets. For example, in some embodiments, host 106 may comprise a client (e.g., web browser), host 142 may comprise a server (e.g., web server), the packets may comprise one or more handshake messages configured to establish session 306 that comprise unencrypted data including a domain name corresponding to the network-threat indicators, for example, a hello message generated by the client (e.g., including the domain name in the server name indication extension, or the like) or a certificate message generated by the server (e.g., including the domain name in one or more of the subject common name field or the extension subjectAltName (of type dNSName), or the like), and rules 212 may be configured to cause rule gate 120 to one or more of identify the packets or determine that the packets comprise data corresponding to the network-threat indicators based on data included in the one or more handshake messages configured to establish session 306. In such embodiments, rules 212 may be configured to cause packet-filtering system 200 to one or more of identify the packets or determine that the packets comprise data corresponding to the network-threat indicators based on the certificate message comprising other data (e.g., in addition to or in lieu of the domain name) corresponding to one or more of the network-threat indicators, for example, data indicating at least one of a serial number (or type thereof) indicated by rules 212, an issuer (or type thereof) indicated by rules 212, a validity time-range (or type thereof) indicated by rules 212, a key (or type thereof) indicated by rules 212, a digital signature (e.g., fingerprint) (or type thereof) indicated by rules 212, or a signing authority (or type thereof) indicated by rules 212.

Similarly, at step #18, proxy device 114 and host 142 may communicate packets comprising data configured to establish encrypted communication session 308 (e.g., a SSL/TLS session) between proxy device 114 and host 142 via connection 304, and rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-17) or the packets comprising one or more handshake messages configured to establish session 308 that comprise unencrypted data (e.g., including the domain name) corresponding to the network-threat indicators, and one or more of log or drop the packets.

Host 106 may generate packets comprising data encrypted in accordance with one or more parameters of session 306 and, at step #19, may communicate the packets to proxy device 112 via session 306. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-18), and one or more of log (as indicated by the triangles over the line extending downward from rule gate 120) or drop the packets.

Proxy device 112 may receive the packets and decrypt the data in accordance with the parameters of session 306. The packets may comprise a request (e.g., a hypertext transfer protocol (HTTP) request), and proxy device 112 may comprise an ICAP client, which, at step #20, may communicate the packets to ICAP server 132. Rule gate 126 may interface a communication link interfacing proxy device 112 and ICAP server 132, and rules 212 may be configured to cause rule gate 126 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-19), and one or more of log or drop the packets.

ICAP server 132 may generate packets comprising data responsive to the request (e.g., a response, modified request, or the like) and, at step #21, may communicate the packets to proxy device 112. Rules 212 may be configured to cause rule gate 126 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-20), and one or more of log or drop the packets. Additionally or alternatively, rules 212 may be configured to cause rule gate 126 to one or more of identify the packets or determine that the packets comprise data corresponding to the network-threat indicators based on data included in the packets, for example, the data responsive to the request (e.g., a modified request) may comprise data (e.g., a domain name, URI, or the like) corresponding to the network-threat indicators.

Proxy device 112 may generate packets (e.g., based on the data generated by ICAP server 132) and, at step #22, may communicate the packets to proxy device 114. Rule gate 124 may interface a communication link internal to the proxy system comprising proxy devices 112 and 114, and thus packets traversing the communication link may comprise unencrypted data (e.g., rule gate 124 may be "the man in the middle" of proxy devices 112 and 114), and rules 212 may be configured to cause rule gate 124 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-21), and one or more of log or drop the packets.

Additionally or alternatively, rules 212 may be configured to cause rule gate 124 to one or more of identify the packets or determine that the packets comprise data corresponding to the network-threat indicators based on data included in the packets, for example, unencrypted data in the packets corresponding to one or more of the network-threat indicators. For example, in some embodiments, packet-filtering system 200 may implement one or more aspects of the technology described in U.S. patent application Ser. No. 13/795,822, filed Mar. 12, 2013, and entitled "FILTERING NETWORK DATA TRANSFERS," the disclosure of which is incorporated by reference herein in its entirety and made part hereof, or similar technology, and rules 212 may be configured to cause rule gate 124 to one or more of identify the packets or determine that the packets comprise data corresponding to the network-threat indicators based on the packets comprising one or more of a URI specified by rules 212, data indicating a protocol version specified by rules 212, data indicating a method specified by rules 212, data indicating a request specified by rules 212, or data indicating a command specified by rules 212. Additionally or alternatively, rules 212 may be configured to cause rule gate 124 to one or more of identify the packets or determine that the packets comprise data corresponding to the one or more network-threat indicators based on unencrypted data in the packets comprising a URI meeting or exceeding a threshold size specified by rules 212 (e.g., a URI likely being utilized to exfiltrate data).

Proxy device 114 may receive the packets and generate one or more corresponding packets comprising data encrypted in accordance with one or more parameters of session 308 and, at step #23, may communicate the packets to host 142. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-22), and one or more of log or drop the packets.

Host 142 may generate one or more packets comprising data encrypted in accordance with one or more parameters of session 308 and, at step #24, may communicate the packets to proxy device 114. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-23), and one or more of log or drop the packets.

Proxy device 114 may receive the packets and generate one or more corresponding packets comprising unencrypted data and, at step #25, may communicate the packets to proxy device 112. Rules 212 may be configured to cause rule gate 124 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-24), and one or more of log or drop the packets.

Proxy device 112 may receive the packets and generate one or more corresponding packets comprising data encrypted in accordance with one or more parameters of session 306 and, at step #26, may communicate the packets to host 106. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-25), and one or more of log or drop the packets.

Host 106 may generate one or more packets comprising data encrypted in accordance with one or more parameters of session 306 and, at step #27, may communicate the packets toward proxy device 112. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-26), and one or more of log or drop the packets.

Proxy device 112 may receive one or more of the packets and generate one or more corresponding packets comprising unencrypted data and, at step #28, may communicate the packets toward proxy device 114. Rules 212 may be configured to cause rule gate 124 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-27), and one or more of log or drop the packets.

Proxy device 114 may receive one or more of the packets and generate one or more corresponding packets comprising data encrypted in accordance with one or more parameters of session 308 and, at step #29, may communicate the packets toward host 142. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-28), and one or more of log or drop the packets.

Host 142 may generate one or more packets comprising data encrypted in accordance with one or more parameters of session 308 and, at step #30, may communicate the packets toward proxy device 114. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-29), and one or more of log or drop the packets.

Proxy device 114 may receive one or more of the packets and generate one or more corresponding packets comprising unencrypted data and, at step #31, may communicate the packets toward proxy device 112. Rules 212 may be configured to cause rule gate 124 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-30), and one or more of log or drop the packets.

Proxy device 112 may receive one or more of the packets and generate one or more corresponding packets comprising data encrypted in accordance with one or more parameters of session 306 and, at step #32, may communicate the packets toward host 106. Rules 212 may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-31), and one or more of log or drop the packets.

Figure 3C:
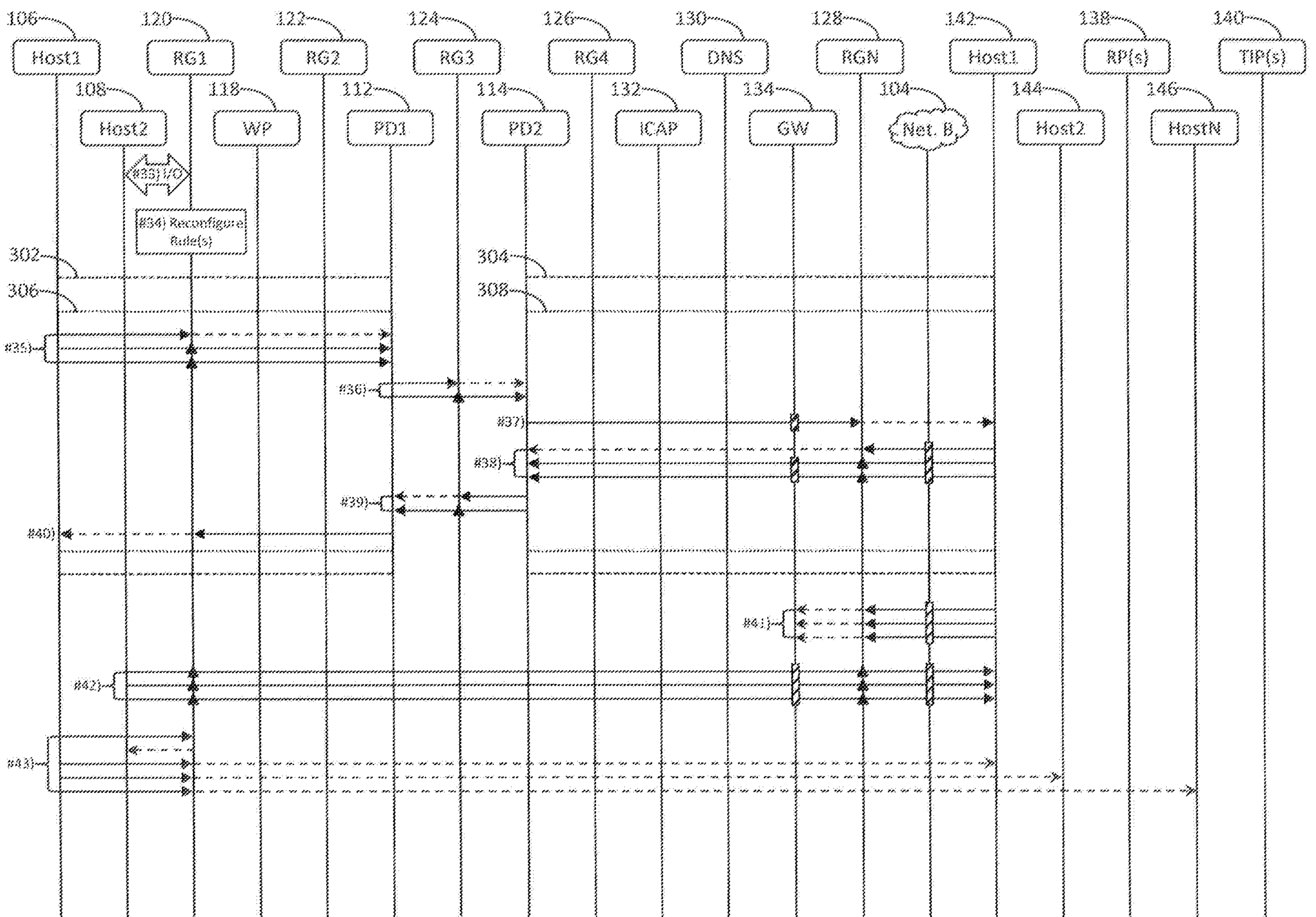

Referring to FIG. 3C, at step #33, rule gate 120 may one or more of update a console (or interface) associated with packet-filtering system 200 running on host 108 or receive one or more updates to rules 212 via the console. For example, the console may provide data regarding one or more threats to network 102 corresponding to the network-threat indicators, and rule gate 120 may update the console based on data stored in logs 214 (e.g., log data generated by packet-filtering system 200 in one or more of step #s 6, 7, or 12-32). In some embodiments, the console may provide data identifying network threats associated with one or more of hosts 106, 108, 110, 142, 144, or 146, and rule gate 120 may update data associated with one or more of hosts 106 or 142 based on data stored in logs 214 (e.g., log data generated by packet-filtering system 200 in one or more of step #s 6, 7, or 12-32).

At step #34, rule gate 120 may reconfigure rules 212 based on one or more of updates received via the console or data stored in logs 214 (e.g., log data generated by packet-filtering system 200 in one or more of step #s 6, 7, or 12-32). For example, packet-filtering system 200 may implement one or more aspects of the technology described in U.S. patent application Ser. No. 14/690,302, filed Apr. 17, 2015, and entitled "RULE-BASED NETWORK-THREAT DETECTION," the disclosure of which is incorporated by reference herein in its entirety and made part hereof, or similar technology, and rule gate 120 may reconfigure rules 212 based on one or more risk scores updated to reflect data stored in logs 214 (e.g., log data generated by packet-filtering system 200 in one or more of step #s 6, 7, or 12-32).

Host 106 may generate one or more packets comprising data encrypted in accordance with one or more parameters of session 306 and, at step #35, may communicate the packets toward proxy device 112. Rules 212 (e.g., one or more of rules 212 reconfigured in step #34) may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, or 12-32), and one or more of log or drop the packets.

Proxy device 112 may receive one or more of the packets and generate one or more corresponding packets comprising unencrypted data and, at step #36, may communicate the packets toward proxy device 114. Rules 212 (e.g., one or more of rules 212 reconfigured in step #34) may be configured to cause rule gate 124 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35), and one or more of log or drop the packets.

Proxy device 114 may receive one or more of the packets and generate one or more corresponding packets comprising data encrypted in accordance with one or more parameters of session 308 and, at step #37, may communicate the packets toward host 142. Rules 212 (e.g., one or more of rules 212 reconfigured in step #34) may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, 35, or 36), and one or more of log or drop the packets.

Host 142 may generate one or more packets comprising data encrypted in accordance with one or more parameters of session 308 and, at step #38, may communicate the packets toward proxy device 114. Rules 212 (e.g., one or more of rules 212 reconfigured in step #34) may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35-37), and one or more of log or drop the packets.

Proxy device 114 may receive one or more of the packets and generate one or more corresponding packets comprising unencrypted data and, at step #39, may communicate the packets toward proxy device 112. Rules 212 (e.g., one or more of rules 212 reconfigured in step #34) may be configured to cause rule gate 124 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35-38), and one or more of log or drop the packets.

Proxy device 112 may receive one or more of the packets and generate one or more corresponding packets comprising data encrypted in accordance with one or more parameters of session 306 and, at step #40, may communicate the packets toward host 106. Rules 212 (e.g., one or more of rules 212 reconfigured in step #34) may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35-39), and one or more of log or drop the packets.

Host 142 may generate one or more packets destined for one or more of hosts 106, 108, or 110 and, at step #41, may communicate the packets toward gateway 134. Rules 212 (e.g., one or more of rules 212 reconfigured in step #34) may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35-40), and one or more of log or drop the packets.

Host 108 may generate one or more packets and, at step #42, may communicate the packets to host 142. Rules 212 (e.g., one or more of rules 212 reconfigured in step #34) may be configured to cause rule gates 120 and 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35-41), and one or more of log or drop the packets.

Host 106 may generate one or more packets destined for hosts 108, 142, 144, and 146 and, at step #43, may communicate the packets toward hosts 108, 142, 144, and 146. Rules 212 (e.g., one or more of rules 212 reconfigured in step #34) may be configured to cause rule gate 120 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6, 7, 12-32, or 35-42), and one or more of log or drop the packets.

Figure 4A:
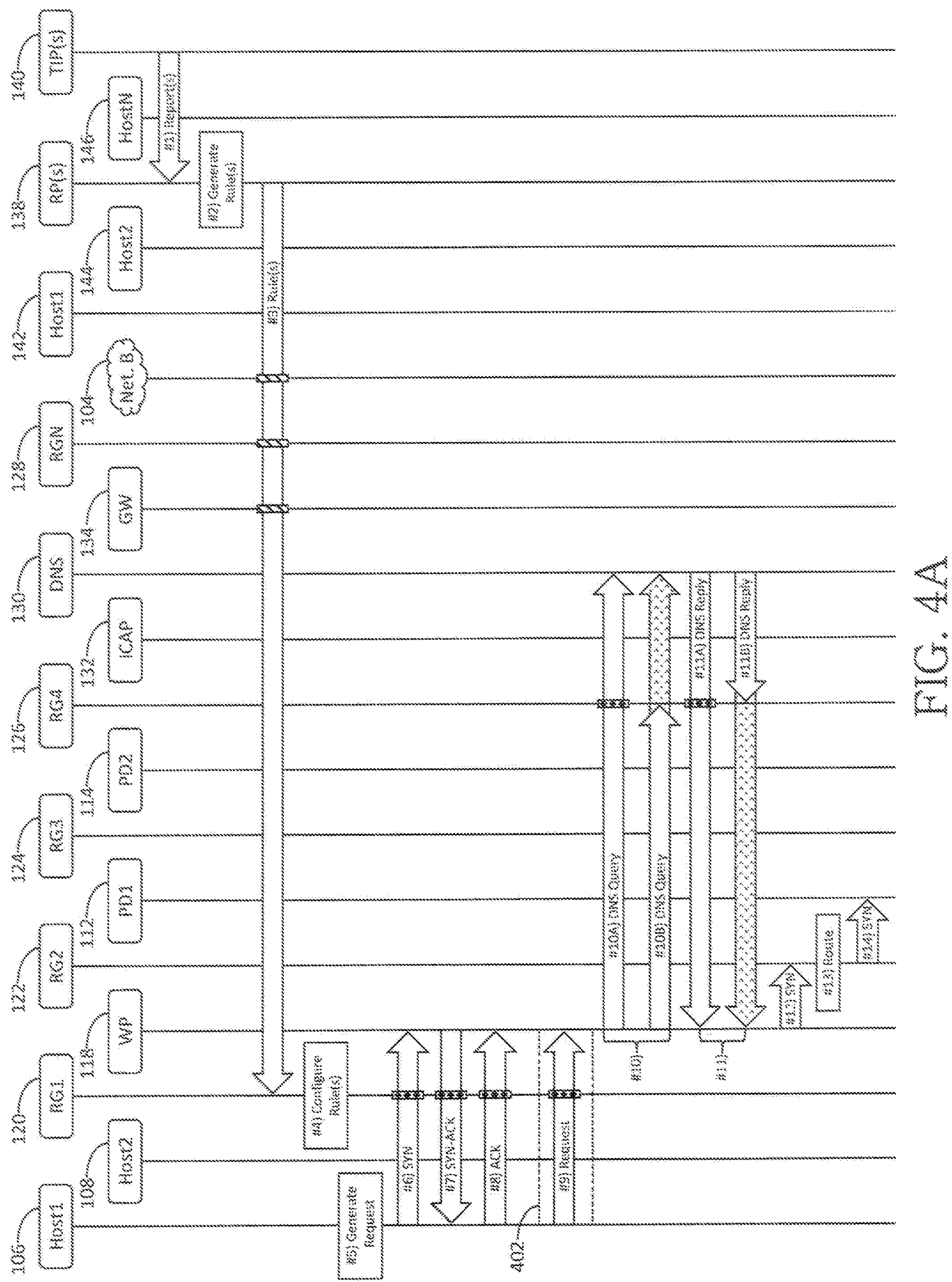

Referring to FIG. 4A, step #s 1-5 substantially correspond to step #s 1-5 of FIG. 3A.

Host 106 (e.g., the web browser) may be configured to utilize web proxy 118 and responsive to the request, may generate packets comprising data configured to establish a connection between host 106 and web proxy 118 (e.g., a TCP: SYN handshake message) and, at step #6, may communicate the packets to web proxy 118. Rule gate 120 may interface a communication link interfacing host 106 and web proxy 118, and rules 212 may be configured to cause rule gate 120 to one or more of identify the packets, for example, based on one or more network addresses included in their network-layer headers (e.g., a network address of web proxy 118) or one or more ports (e.g., port 80) indicated by transport-layer headers in the packets, and one or more of log or drop the packets.

Responsive to receiving the packets from host 106, web proxy 118 may generate packets comprising data configured to establish the connection between host 106 and web proxy 118 (e.g., a TCP: SYN-ACK handshake message) and, at step #7, may communicate the packets to host 106. Rules 212 may be configured to cause rule gate 120 to one or more of identify the packets, for example, based on one or more network addresses included in their network-layer headers (e.g., a network address of web proxy 118) or one or more ports (e.g., port 80) indicated by transport-layer headers in the packets, and one or more of log or drop the packets.

Responsive to receiving the packets from web proxy 118, host 106 may generate packets comprising data configured to establish the connection between host 106 and web proxy 118 (e.g., a TCP: ACK handshake message) and, at step #8, may communicate the packets to web proxy 118. Rules 212 may be configured to cause rule gate 120 to one or more of identify the packets, for example, based on one or more network addresses included in their network-layer headers (e.g., a network address of web proxy 118) or one or more ports (e.g., port 80) indicated by transport-layer headers in the packets, and one or more of log or drop the packets.

Web proxy 118 may receive the packets from host 106, and connection 402 (e.g., a TCP connection) between host 106 and web proxy 118 may be established. Host 106 may generate packets comprising a request (e.g., an HTTP CONNECT request), and, at step #9, may communicate the packets to web proxy 118 via connection 402. Rules 212 may be configured to cause rule gate 120 to one or more of identify the packets, for example, based on one or more network addresses included in their network-layer headers (e.g., a network address of web proxy 118) or one or more ports (e.g., port 80) indicated by transport-layer headers in the packets, determine the packets comprise data corresponding to the network-threat indicators, for example, a domain name (e.g., FQDN) in the request, and one or more of log or drop the packets.

Web proxy 118 may generate a DNS query comprising the domain name and, at step #10, may communicate the DNS query toward DNS 130. The domain name included in the request may correspond to one or more of the network-threat indicators, and rules 212 may be configured to cause rule gate 126 to one or more of identify one or more packets comprising the DNS query, determine that the packets comprise the domain name corresponding to the network-threat indicators, and one or more of log or drop the packets. For example, the packets may comprise a network address of web proxy 118 (e.g., as a source address in their network-layer headers), and rule gate 126 may generate log data indicating the network address of web proxy 118. As depicted by step #10A, the packets may be communicated to DNS 130. In some embodiments, rules 212 may be configured to cause rule gate 126 to, responsive to determining that the packets comprise the domain name corresponding to the network-threat indicators, drop the packets, preventing them from reaching DNS 130, as depicted by step #10B.

DNS 130 may generate a reply to the DNS query and, at step #11, may communicate the reply toward web proxy 118. The reply may comprise the domain name corresponding to the network-threat indicators, and rules 212 may be configured to cause rule gate 126 to one or more of identify one or more packets comprising the reply, determine that the packets comprise the domain name corresponding to the network-threat indicators, and one or more of log or drop the packets. For example, the packets may comprise the network address of web proxy 118 (e.g., as a destination address in their network-layer headers), and rule gate 126 may generate log data indicating the network address of web proxy 118. Similarly, the domain name may correspond to host 142, the packets may comprise a network address of host 142 (e.g., DNS 130 may have resolved the domain name included in the query to the network address of host 142.), and rule gate 126 may generate log data indicating the network address of host 142. As depicted by step #11A, the packets may be communicated to web proxy 118. In some embodiments, rules 212 may be configured to cause rule gate 126 to, responsive to determining that the packets comprise the domain name corresponding to the network-threat indicators, drop the packets, preventing them from reaching web proxy 118, as depicted by step #11B.

Web proxy 118 may generate one or more packets destined for host 142 comprising data (e.g., a TCP: SYN handshake message) configured to establish a connection (e.g., a TCP connection or tunnel) between web proxy 118 and host 142 and, at step #12, may communicate the packets toward host 142. Rule gate 122 may interface a communication link interfacing web proxy 118 and host 142, and rules 212 may be configured to cause rule gate 122 to one or more of identify the packets or determine (e.g., based on one or more network addresses included in their network-layer headers) that the packets comprise data corresponding to the network-threat indicators, for example, by correlating the packets with one or more of the packets comprising the request, the DNS query, or the reply to the DNS query based on data stored in logs 214 (e.g., the log data generated by rule gates 120 and 126 in one or more of step #s 6-11).

At step #13, rule gate 122 may route the packets comprising the data configured to establish the connection between web proxy 118 and host 142 to proxy device 112 and, at step #14, may communicate the packets to proxy device 112. For example, rules 212 may be configured to cause rule gate 122 to route the packets to proxy device 112 based on data in the packets, for example, one or more ports (e.g., port 443) indicated by transport-layer headers in the packets, indicating the connection between web proxy 118 and host 142 will be utilized to establish an encrypted communication session or tunnel (e.g., a session established in accordance with the transport layer security (TLS) protocol, secure sockets layer (SSL) protocol, secure shell (SSH) protocol, or the like).

Figure 4B:
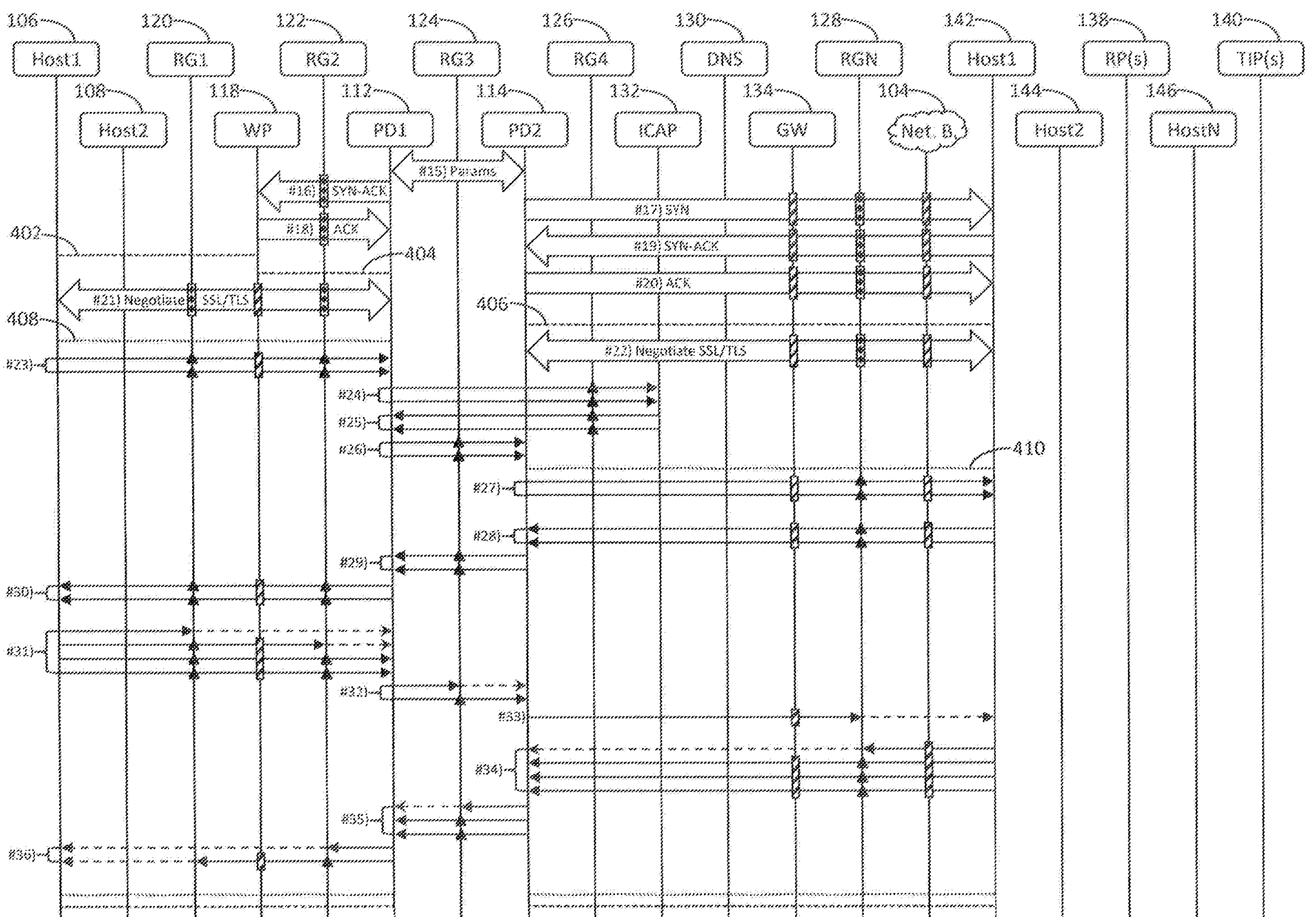

Referring to FIG. 4B, at step #15, proxy devices 112 and 114 may exchange one or more parameters determined from the packets comprising the data configured to establish the connection between web proxy 118 and host 142, for example, one or more network addresses in network-layer headers of the packets (e.g., network addresses of web proxy 118 and host 142) or ports indicated by transport-layer headers in the packets (e.g., indicating the type of encrypted communication session the connection will be utilized to establish). Proxy device 112 may utilize the parameters to generate packets comprising data configured to establish a connection between proxy device 112 and web proxy 118 (e.g., a TCP: SYN-ACK handshake message) and, at step #16, may communicate the packets to web proxy 118. Rules 212 may be configured to cause rule gate 122 to one or more of identify the packets or determine (e.g., based on one or more network addresses included in their network-layer headers) that the packets comprise data corresponding to the network-threat indicators, for example, by correlating the packets with one or more of the packets comprising the request, the DNS query, or the reply to the DNS query based on data stored in logs 214 (e.g., the log data generated by rule gates 120 and 126 in one or more of step #s 6-11).

Similarly, proxy device 114 may utilize the parameters to generate packets comprising data configured to establish a connection between proxy device 114 and host 142 (e.g., a TCP: SYN handshake message) and, at step #17, may communicate the packets to host 142. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11 or 16), and one or more of log or drop the packets.

Responsive to receiving the packets from proxy device 112, web proxy 118 may generate packets comprising data configured to establish the connection between proxy device 112 and web proxy 118 (e.g., a TCP: ACK handshake message) and, at step #18, may communicate the packets to proxy device 112. Rules 212 may be configured to cause rule gate 122 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11, 16, or 17), and one or more of log or drop the packets.

Responsive to receiving the packets from proxy device 114, host 142 may generate packets comprising data configured to establish the connection between proxy device 114 and host 142 (e.g., a TCP: SYN-ACK handshake message) and, at step #19, may communicate the packets to proxy device 114. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11 or 16-18), and one or more of log or drop the packets.

Responsive to receiving the packets from host 142, proxy device 114 may generate packets comprising data configured to establish the connection between proxy device 114 and host 142 (e.g., a TCP: ACK handshake message) and, at step #20, may communicate the packets to host 142. Rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11 or 16-19), and one or more of log or drop the packets.

Proxy device 112 may receive the packets comprising data configured to establish the connection between proxy device 112 and web proxy 118 communicated by web proxy 118 in step #18, and connection 404 (e.g., a TCP connection) between proxy device 112 and web proxy 118 may be established. Similarly, host 142 may receive the packets comprising data configured to establish the connection between proxy device 114 and host 142 communicated by proxy device 114 in step #20, and connection 406 (e.g., a TCP connection) between proxy device 114 and host 142 may be established.

At step #21, proxy device 112 and host 106 may communicate packets comprising data configured to establish encrypted communication session 408 (e.g., a SSL/TLS session) between proxy device 112 and host 106 via connections 402 and 404. Rules 212 may be configured to cause one or more of rule gates 120 or 122 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11 or 16-20) or the packets comprising one or more handshake messages configured to establish session 408 that comprise unencrypted data (e.g., including the domain name) corresponding to the network-threat indicators, and one or more of log or drop the packets.

Similarly, at step #22, proxy device 114 and host 142 may communicate packets comprising data configured to establish encrypted communication session 410 (e.g., a SSL/TLS session) between proxy device 114 and host 142 via connection 406, and rules 212 may be configured to cause rule gate 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11 or 16-21) or the packets comprising one or more handshake messages configured to establish session 410 that comprise unencrypted data (e.g., including the domain name) corresponding to the network-threat indicators, and one or more of log or drop the packets.

Figure 4C:
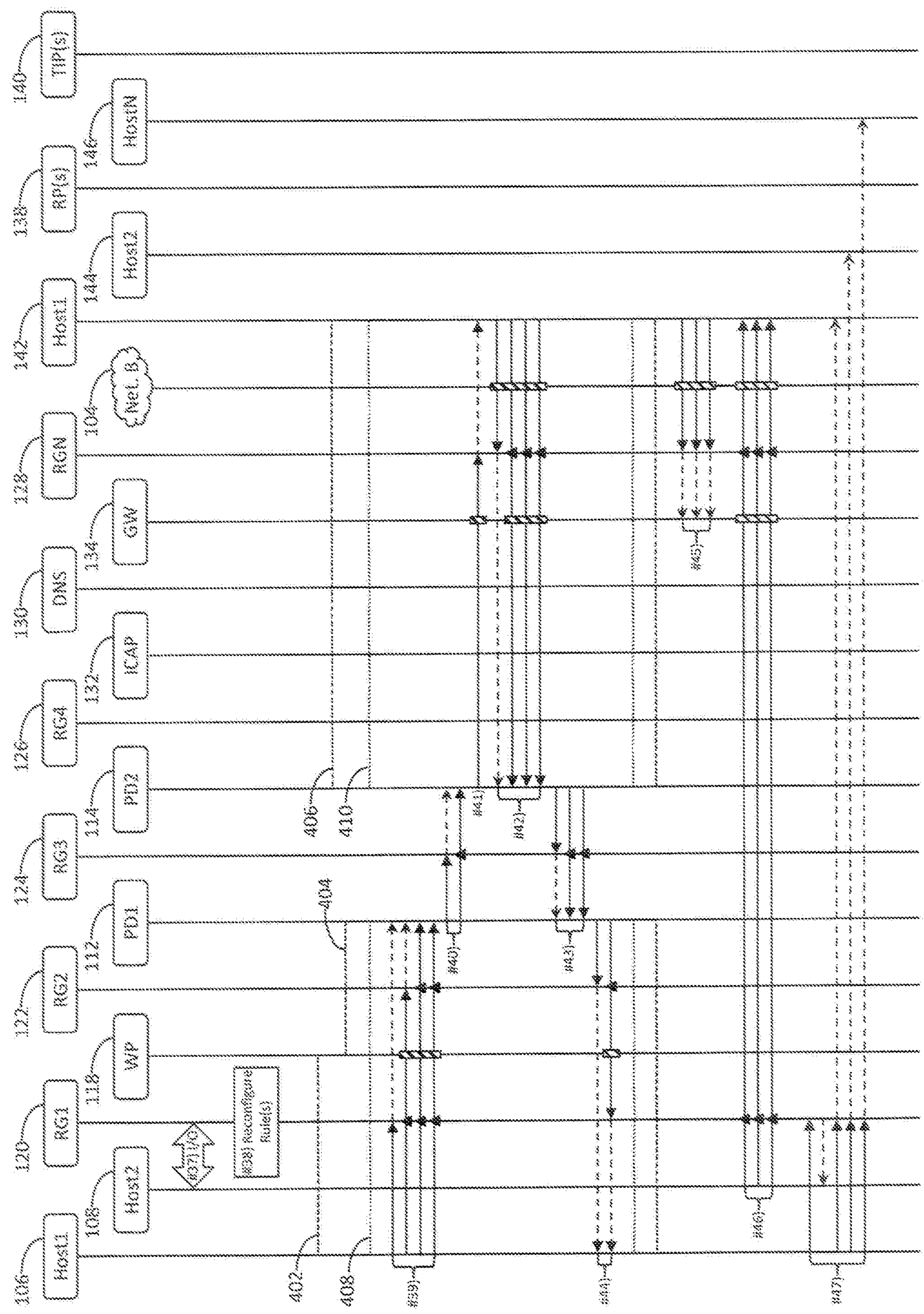

Referring to FIGS. 4B-C, step #s 23-47 substantially correspond to step #s 19-43 of FIGS. 3B-C; however, rules 212 may be configured to cause one or more of rule gates 120 or 122 to one or more of identify, drop, or log the packets communicated in one or more of step #s 23, 30, 31, 36, 39, or 44 of FIGS. 4B-C.

Referring to FIG. 5A, step #s 1-7 substantially correspond to step #s 1-7 of FIG. 3A.

Host 106 may generate one or more packets destined for host 142 comprising data (e.g., a TCP: SYN handshake message) configured to establish a connection (e.g., a TCP connection or tunnel) between hosts 106 and 142 and, at step #8, may communicate the packets to host 142. Rules 212 may be configured to cause one or more of rule gates 120 or 128 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #6 or #7).

Responsive to receiving the packets from host 106, host 142 may generate packets comprising data configured to establish the connection between hosts 106 and 142 (e.g., a TCP: SYN-ACK handshake message) and, at step #9, may communicate the packets to host 106. Rules 212 may be configured to cause one or more of rule gates 120 or 128 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #6 or #7).

Responsive to receiving the packets from host 142, host 106 may generate packets comprising data configured to establish the connection between hosts 106 and 142 (e.g., a TCP: ACK handshake message) and, at step #10, may communicate the packets to host 142. Rules 212 may be configured to cause one or more of rule gates 120 or 128 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #6 or #7).

Host 142 may receive the packets comprising data configured to establish the connection between hosts 106 and 142 communicated by host 106 in step #10, and connection 502 (e.g., a TCP connection) between hosts 106 and 142 may be established.

At step #11, hosts 106 and 142 may communicate packets comprising data configured to establish encrypted communication session 504 (e.g., a SSL/TLS session) between hosts 106 and 142 via connection 502. Rules 212 may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-10) or the packets comprising one or more handshake messages configured to establish session 504 that comprise unencrypted data (e.g., including the domain name) corresponding to the network-threat indicators, and one or more of log or drop the packets.

Host 106 may generate packets comprising data encrypted in accordance with one or more parameters of session 504 and, at step #12, may communicate the packets to host 142. Rules 212 may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-11), and one or more of log or drop the packets.

Host 142 may generate packets comprising data encrypted in accordance with one or more parameters of session 504 and, at step #13, may communicate the packets to host 106. Rules 212 may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-12), and one or more of log or drop the packets.

Host 106 may generate packets comprising data encrypted in accordance with one or more parameters of session 504 and, at step #14, may communicate the packets toward host 142. Rules 212 may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-13), and one or more of log or drop the packets.

Host 142 may generate packets comprising data encrypted in accordance with one or more parameters of session 504 and, at step #15, may communicate the packets toward host 106. Rules 212 may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-14), and one or more of log or drop the packets.

Referring to FIG. 513, steps #16 and #17 substantially correspond to steps #33 and #34 of FIG. 3C.

Host 106 may generate packets comprising data encrypted in accordance with one or more parameters of session 504 and, at step #18, may communicate the packets toward host 142. Rules 212 (e.g., one or more of rules 212 reconfigured in step #17) may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-15), and one or more of log or drop the packets.

Host 142 may generate packets comprising data encrypted in accordance with one or more parameters of session 504 and, at step #19, may communicate the packets toward host 106. Rules 212 (e.g., one or more of rules 212 reconfigured in step #17) may be configured to cause one or more of rule gates 120 or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-15 and 18), and one or more of log or drop the packets.

Step #s 20-22 substantially correspond to step #s 41-43 of FIG. 3C.

Referring to FIG. 6A, step #s 1-11 substantially correspond to step #s 1-11 of FIG. 4A.

Web proxy 118 may generate one or more packets destined for host 142 comprising data (e.g., a TCP: SYN handshake message) configured to establish a connection (e.g., a TCP connection or tunnel) between web proxy 118 and host 142 and, at step #12, may communicate the packets to host 142. Rules 212 may be configured to cause one or more of rule gates 122 or 128 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #10 or #11).

Responsive to receiving the packets from web proxy 118, host 142 may generate packets comprising data configured to establish the connection between web proxy 118 and host 142 (e.g., a TCP: SYN-ACK handshake message) and, at step #13, may communicate the packets to web proxy 118. Rules 212 may be configured to cause one or more of rule gates 122 or 128 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #10 or #11).

Responsive to receiving the packets from host 142, web proxy 118 may generate packets comprising data configured to establish the connection between web proxy 118 and host 142 (e.g., a TCP: ACK handshake message) and, at step #14, may communicate the packets to host 142. Rules 212 may be configured to cause one or more of rule gates 122 or 128 to one or more of identify the packets or determine (e.g., based on one or more network addresses included in their network-layer headers) that the packets comprise data corresponding to the network-threat indicators, for example, by correlating the packets with one or more of the packets comprising the DNS query or the reply to the DNS query based on data stored in logs 214 (e.g., the log data generated by rule gate 126 in one or more of steps #10 or #11).

Referring to FIG. 6B, host 142 may receive the packets comprising data configured to establish the connection between web proxy 118 and host 142 communicated by web proxy 118 in step #14, and connection 604 (e.g., a TCP connection) between web proxy 118 and host 142 may be established.

At step #15, hosts 106 and 142 may communicate packets comprising data configured to establish encrypted communication session 606 (e.g., a SSL/TLS session) between hosts 106 and 142 via connections 602 and 604. Rules 212 may be configured to cause one or more of rule gates 120, 122, or 128 to one or more of identify the packets, determine (e.g., based on one or more network addresses included in their network-layer headers) that the packets comprise data corresponding to the network-threat indicators, for example, by correlating the packets with one or more packets previously determined by packet-filtering system 200 to comprise data corresponding to the network-threat indicators based on data stored in logs 214 (e.g., log data generated by packet-filtering system 200 in one or more of step #s 6-15) or the packets comprising one or more handshake messages configured to establish session 606 that comprise unencrypted data (e.g., including the domain name) corresponding to the network-threat indicators, and one or more of log or drop the packets.

Step #s 16-26 substantially correspond to step #s 12-22 of FIGS. 5A-B; however, rules 212 may be configured to cause one or more of rule gates 120, 122, or 128 to one or more of identify, drop, or log the packets communicated in one or more of step #s 16-19, 22, or 23 of FIG. 6B.

FIG. 7 depicts an illustrative method for rule-based network-threat detection for encrypted communications in accordance with one or more aspects of the disclosure. Referring to FIG. 7, in step 702, a packet-filtering system may receive data indicating network-threat indicators. For example, packet-filtering system 200 may receive packet-filtering rules generated by rule provides 138 based on network-threat indicators provided by threat-intelligence providers 140. In step 704, the packet-filtering system may configure packet-filtering rules in accordance with which it is configured to filter packets. For example, packet-filtering system 200 may configure rules 212.

In step 706, the packet-filtering system may identify packets comprising unencrypted data. For example, packet-filtering system 200 may identify packets comprising a DNS query, a reply to a DNS query, or a handshake message configured to establish an encrypted communication session. In step 708, the packet-filtering system may identify packets comprising encrypted data. For example, packet-filtering system 200 may identify packets encrypted in accordance with one or more parameters of sessions 306, 308, 408, 410, 504, or 606.

In step 710, the packet-filtering system may determine based on a portion of the unencrypted data corresponding to the network-threat indicators that the packets comprising encrypted data correspond to the network-threat indicators. For example, packet-filtering system 200 may determine that a domain name included in the DNS query, the reply to the DNS query, or the handshake message corresponds to the network-threat indicators, and packet-filtering system 200 may determine that one or more of the packets encrypted in accordance with the parameters of sessions 306, 308, 408, 410, 504, or 606 correlate to one or more packets comprising the DNS query, the reply to the DNS query, or the one or more handshake messages.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A packet-filtering system comprising:

one or more processors; and memory storing instructions that, when executed by the one or more processors, cause the packet-filtering system to:

receive a plurality of network-threat indicators from a plurality of third-party network threat intelligence providers located external to a network comprising the packet-filtering system, wherein each of the plurality of third-party network intelligence providers provides at least a portion of the plurality of network-threat indicators;

receive one or more unencrypted packets;

analyze first unencrypted data contained in the one or more unencrypted packets, wherein the first unencrypted data comprises at least a portion of a Transport Layer Security (TLS) handshake, and wherein the at least a portion of the TLS handshake comprises a host domain name;

determine that the one or more unencrypted packets correspond to a first rule by comparing the host domain name of the first unencrypted data to a first network-threat indicator of the plurality of network-threat indicators, wherein the first network-threat indicator comprises a domain name associated with a potential network threat;

based on determining that the one or more unencrypted packets correspond to the first rule, generate a log entry comprising:

an indication of the domain name associated with the potential network threat, and a network address corresponding to the host domain name;

receive one or more encrypted packets as part of an encrypted communication session that corresponds to the TLS handshake subsequent to receiving the one or more unencrypted packets;

correlate, based on determining that an IP address in one or more packet headers of the one or more encrypted packets matches the network address of the log entry, the one or more encrypted packets with the one or more unencrypted packets;

determine, based on correlating the one or more encrypted packets with the one or more unencrypted packets and based on the log entry, that the one or more encrypted packets correspond to the domain name associated with the potential network threat;

in response to determining that the one or more encrypted packets correspond to the domain name associated with the potential network threat, filter the one or more encrypted packets based on the first rule; and send at least a portion of the filtered one or more encrypted packets to a proxy configured to apply an action to the at least the portion of the filtered one or more encrypted packets.

2. The packet-filtering system of claim 1, wherein the instructions, when executed by the one or more processors, cause the packet-filtering system to:

determine, using a Domain Name System (DNS) query, the network address corresponding to the host domain name.

3. The packet-filtering system of claim 1, wherein the packet-filtering system does not comprise the proxy.

4. The packet-filtering system of claim 1, wherein the instructions, when executed by the one or more processors, cause the packet-filtering system to correlate the one or more encrypted packets with the one or more unencrypted packets further based on:

a first time stamp associated with the one or more encrypted packets, and a second time stamp associated with the first unencrypted data.

5. The packet-filtering system of claim 1, wherein the instructions, when executed by the one or more processors, cause the packet-filtering system to correlate the one or more encrypted packets with the one or more unencrypted packets further based on a port number associated with the first unencrypted data.

6. The packet-filtering system of claim 1, wherein the network address and the IP address are the same.

7. The packet-filtering system of claim 1, wherein the instructions, when executed by the one or more processors, cause the packet-filtering system to receive the one or more encrypted packets, correlate the one or more encrypted packets with the one or more unencrypted packets, determine that the one or more encrypted packets correspond to the domain name, and filter the one or more encrypted packets without decrypting the one or more encrypted packets.

8. The packet-filtering system of claim 1, wherein the proxy is configured to prevent further transmission of the one or more encrypted packets based on the first rule.

9. The packet-filtering system of claim 1, wherein the action comprises decrypting, by the proxy, the at least the portion of the filtered one or more encrypted packets based on the TLS handshake.

10. The packet-filtering system of claim 9, wherein the instructions, when executed by the one or more processors, cause the packet-filtering system to:

send, to the proxy, the TLS handshake.

11. The packet-filtering system of claim 1, wherein the action comprises dropping, by the proxy, the at least the portion of the filtered one or more encrypted packets.

12. A packet-filtering system comprising:

one or more processors; and memory storing instructions that, when executed by the one or more processors, cause the packet-filtering system to:

receive a plurality of network-threat indicators from a plurality of third-party network threat intelligence providers located external to a network comprising the packet-filtering system, wherein each of the plurality of third-party network intelligence providers provides at least a portion of the plurality of network-threat indicators;

receive one or more unencrypted packets;

analyze first unencrypted data contained in the one or more unencrypted packets, wherein the first unencrypted data is associated with initiation of a Transmission Control Protocol (TCP) connection, and wherein the first unencrypted data comprises a host domain name;

determine that the one or more unencrypted packets correspond to a first rule by comparing the host domain name of the first unencrypted data to a first network-threat indicator of the plurality of network-threat indicators, wherein the first network-threat indicator comprises a domain name associated with a potential network threat;

based on determining that the one or more unencrypted packets correspond to the first rule, generate a log entry comprising:

an indication of the domain name associated with the potential network threat, and a network address corresponding to the host domain name;

receive one or more encrypted packets as part of an encrypted communication session associated with the initiation of the TCP connection subsequent to receiving the one or more unencrypted packets;

correlate, based on determining that an IP address in one or more packet headers of the one or more encrypted packets matches the network address of the log entry, the one or more encrypted packets with the one or more unencrypted packets;

determine, based on correlating the one or more encrypted packets with the one or more unencrypted packets and based on the log entry, that the one or more encrypted packets correspond to the domain name associated with the potential network threat;

in response to determining that the one or more encrypted packets correspond to the domain name associated with the potential network threat, filter the one or more encrypted packets based on the first rule; and send at least a portion of the one or more encrypted packets to a proxy configured to apply an action to the at least the portion of the filtered one or more encrypted packets.

13. The packet-filtering system of claim 12, wherein the instructions, when executed by the one or more processors, cause the packet-filtering system to:

determine, using a Domain Name System (DNS), the network address corresponding to the host domain name.

14. The packet-filtering system of claim 12, wherein the packet-filtering system does not comprise the proxy.

15. The packet-filtering system of claim 12, wherein the instructions, when executed by the one or more processors, cause the packet-filtering system to correlate the one or more encrypted packets with the one or more unencrypted packets further based on:

a first time stamp associated with the one or more encrypted packets, and a second time stamp associated with the first unencrypted data.

16. The packet-filtering system of claim 12, wherein the instructions, when executed by the one or more processors, cause the packet-filtering system to correlate the one or more encrypted packets with the one or more unencrypted packets further based on a port number associated with the first unencrypted data.

17. The packet-filtering system of claim 12, wherein the network address and the IP address are the same.

18. The packet-filtering system of claim 12, wherein the instructions, when executed by the one or more processors, cause the packet-filtering system to receive the one or more encrypted packets, correlate the one or more encrypted packets with the one or more unencrypted packets, determine that the one or more encrypted packets correspond to the domain name, and filter the one or more encrypted packets without decrypting the one or more encrypted packets.

19. The packet-filtering system of claim 12, wherein the proxy is configured to prevent further transmission of the one or more encrypted packets based on the first rule.

20. The packet-filtering system of claim 12, wherein the action comprises decrypting, by the proxy, the at least the portion of the filtered one or more encrypted packets.

21. The packet-filtering system of claim 12, wherein the action comprises dropping, by the proxy, the at least the portion of the filtered one or more encrypted packets.

22. A method comprising:

receiving, by a packet-filtering system, a plurality of network-threat indicators from a plurality of third-party network threat intelligence providers located external to a network comprising the packet-filtering system, wherein each of the plurality of third-party network intelligence providers provides at least a portion of the plurality of network-threat indicators;

receiving one or more unencrypted packets;

analyzing first unencrypted data contained in the one or more unencrypted packets, wherein the first unencrypted data comprises at least a portion of a Transport Layer Security (TLS) handshake, and wherein the at least a portion of the TLS handshake comprises a host domain name;

determining that the one or more unencrypted packets correspond to a first rule by comparing the host domain name of the first unencrypted data to a first network-threat indicator of the plurality of network-threat indicators, wherein the first network-threat indicator comprises a domain name associated with a potential network threat;

based on determining that the one or more unencrypted packets correspond to the first rule, generating a log entry comprising:

an indication of the domain name associated with the potential network threat, and a network address corresponding to the host domain name;

receiving one or more encrypted packets as part of an encrypted communication session that corresponds to the TLS handshake subsequent to receiving the one or more unencrypted packets;

correlating, based on determining that an IP address in one or more packet headers of the one or more encrypted packets matches the network address of the log entry, the one or more encrypted packets with the one or more unencrypted packets;

determining, based on correlating the one or more encrypted packets with the one or more unencrypted packets and based on the log entry, that the one or more encrypted packets correspond to the domain name associated with the potential network threat;

in response to determining that the one or more encrypted packets correspond to the domain name associated with the potential network threat, filtering, by the packet-filtering system, the one or more encrypted packets based on the first rule; and sending at least a portion of the one or more encrypted packets to a proxy configured to apply an action to the at least the portion of the filtered one or more encrypted packets.

23. The method of claim 22, further comprising:

determining, using a Domain Name System (DNS) query, the network address corresponding to the host domain name.

24. The method of claim 22, wherein the packet-filtering system does not comprise a-the proxy.

25. The method of claim 22, wherein correlating the one or more encrypted packets with the one or more unencrypted packets is further based on:

a first time stamp associated with the one or more encrypted packets, and a second time stamp associated with the first unencrypted data.

26. The method of claim 22, wherein receiving the one or more encrypted packets, correlating the one or more encrypted packets with the one or more unencrypted packets, determining that the one or more encrypted packets correspond to the domain name, and filtering the one or more encrypted packets are performed without decrypting the one or more encrypted packets.

27. A method comprising:

receiving, by a packet-filtering system, a plurality of network-threat indicators from a plurality of third-party network threat intelligence providers located external to a network comprising the packet-filtering system, wherein each of the plurality of third-party network intelligence providers provides at least a portion of the plurality of network-threat indicators;

receiving one or more unencrypted packets;

analyzing first unencrypted data contained in the one or more unencrypted packets, wherein the first unencrypted data is associated with initiation of a Transmission Control Protocol (TCP) connection, and wherein the first unencrypted data comprises a host domain name;

determining that the one or more unencrypted packets correspond to a first rule by comparing the host domain name of the first unencrypted data to a first network-threat indicator of the plurality of network-threat indicators, wherein the first network-threat indicator comprises a domain name associated with a potential network threat;

based on determining that the one or more unencrypted packets correspond to the first rule, generating a log entry comprising:

an indication of the domain name associated with the potential network threat, and a network address corresponding to the host domain name;

receiving one or more encrypted packets as part of an encrypted communication session associated with the initiation of the TCP connection subsequent to receiving the one or more unencrypted packets;

correlating, based on determining that an IP address in one or more packet headers of the one or more encrypted packets matches the network address of the log entry, the one or more encrypted packets with the one or more unencrypted packets;

determining, based on correlating the one or more encrypted packets with the one or more unencrypted packets and based on the log entry, that the one or more encrypted packets correspond to the domain name associated with the potential network threat;

in response to determining that the one or more encrypted packets correspond to the domain name associated with the potential network threat, filtering, by the packet-filtering system, the one or more encrypted packets based on the first rule; and sending at least a portion of the one or more encrypted packets to a proxy configured to apply an action to the at least the portion of the filtered one or more encrypted packets.

28. The method of claim 27, further comprising:

determining, using a Domain Name System (DNS), the network address.

29. The method of claim 27, wherein the packet-filtering system does not comprise a-the proxy.

30. The method of claim 27, wherein receiving the one or more encrypted packets, correlating the one or more encrypted packets with the one or more unencrypted packets, determining that the one or more encrypted packets correspond to the domain name, and filtering the one or more encrypted packets are performed without decrypting the one or more encrypted packets.

* * * * *

UNITED STATES PATENT AND TRADEMARK OFFICE

CERTIFICATE OF CORRECTION

PATENT NO. : 11,477,224 B2
APPLICATION NO. : 17/482910
DATED : October 18, 2022
INVENTOR(S) : Ahn et al.

It is certified that error appears in the above-identified patent and that said Letters Patent is hereby corrected as shown below:

On the Title Page

Page 4, Column 2, Item (56) Other Publications Line 63:
Delete "Reporton" and insert --Report on-- therefor Page 5, Column 2, Item (56) Other Publications Line 4:
Delete "Sep. 1, 2018" and insert --Sep. 18, 2018-- therefor Page 5, Column 2, Item (56) Other Publications Line 63:
Before "Re-Exam", insert --May 5, 2021, (US) File Wrapper of--

Page 7, Column 1, Item (56) Other Publications Line 31:
Delete "IDDsfor" and insert --IDDs for-- therefor Page 7, Column 2, Item (56) Other Publications Line 37:
Delete "Jul. 27, 20187" and insert --Jul. 27, 2018-- therefor Page 8, Column 2, Item (56) Other Publications Line 9:
Delete "for for" and insert --for-- therefor Page 8, Column 2, Item (56) Other Publications Line 16:
Delete "Jun. 2, 20224," and insert --Jun. 24, 2022,-- therefor Page 8, Column 2, Item (56) Other Publications Line 47:
Delete "3,917,856," and insert --9,917,856,-- therefor Page 8, Column 2, Item (56) Other Publications Line 55:
Delete "1,917,856," and insert --9,917,856,-- therefor Signed and Sealed this
Seventh Day of March, 2023

Katherine Kelly Vidal

Katherine Kelly Vidal
*Director of the United States Patent and Trademark Office*

In the Claims

Column 29, Line 15 In Claim 24:
Delete "a-the" and insert --the-- therefor

Column 30, Line 39 In Claim 29:
Delete "a-the" and insert --the-- therefor